US012713256B2

(12) United States Patent
Lee et al.

(10) Patent No.: US 12,713,256 B2
(45) Date of Patent: Aug. 18, 2026

(54) METHOD AND DEVICE FOR MEASURING PERFORMANCE IN WIRELESS COMMUNICATION SYSTEM

(71) Applicant: Samsung Electronics Co., Ltd., Suwon-si (KR)

(72) Inventors: Chungkeun Lee, Suwon-si (KR); Junhyuk Song, Suwon-si (KR); Jungmin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 297 days.

(21) Appl. No.: 18/171,961

(22) Filed: Feb. 21, 2023

(65) Prior Publication Data

US 2023/0199539 A1 Jun. 22, 2023

Related U.S. Application Data

(63) Continuation of application No. PCT/KR2021/011233, filed on Aug. 23, 2021.

(30) Foreign Application Priority Data

Aug. 21, 2020 (KR) ........................ 10-2020-0105679

(51) Int. Cl.
*H04W 24/08* (2009.01)
*H04W 92/12* (2009.01)

(52) U.S. Cl.
CPC ............ *H04W 24/08* (2013.01); *H04W 92/12* (2013.01)

(58) Field of Classification Search
CPC ....... H04W 24/08; H04W 92/12; H04W 8/26; H04W 88/085; H04W 88/12;
(Continued)

(56) References Cited

U.S. PATENT DOCUMENTS 11,240,686 B2 2/2022 Bapat et al.
2010/0260096 A1 10/2010 Ulupinar et al.
(Continued)

FOREIGN PATENT DOCUMENTS

CN 111242304 A 6/2020
CN 111510959 A 8/2020

OTHER PUBLICATIONS

O-RAN-WG3.E2SM-KPM-v01.00.00.*
(Continued)

*Primary Examiner* — Zhitong Chen
(74) *Attorney, Agent, or Firm* — Jefferson IP Law, LLP

(57) ABSTRACT

The disclosure relates to a $5^{th}$ generation (5G) or pre-5G communication system for supporting a data transmission rate higher than $4^{th}$ generation (4G) communication systems such as long term evolution (LTE). A method performed by an E2 node is provided. The method includes a step of transmitting a radio access network (RAN) intelligent controller (RIC) indication message to a RIC, wherein the RIC indication message comprises an E2 service model (E2SM)-KPM indication message format 1 and an E2SM-KPM indication message format 2 for key performance measurement (KPM), the E2SM-KPM indication message format 1 does not comprise terminal identification information, and the E2SM-KPM indication message format 2 comprises terminal identification information. According to embodiments of the disclosure, the method performed by the E2 node includes a step of receiving a radio access network (RAN) intelligent controller (RIC) control message from the RIC, wherein the RIC control message can comprise slice identification information and control information with respect to a network slice corresponding to the slice identification information.

10 Claims, 14 Drawing Sheets

(58) Field of Classification Search
CPC ............... H04W 88/08; H04L 43/0811; H04L 43/0852; H04L 43/0888
See application file for complete search history.

(56) References Cited

U.S. PATENT DOCUMENTS

| | | | |
|---|---|---|---|
| 2015/0208274 | A1 | 7/2015 | Himayat et al. |
| 2016/0014667 | A1 | 1/2016 | Sirotkin et al. |
| 2018/0077023 | A1 | 3/2018 | Zhang |
| 2019/0327665 | A1 | 10/2019 | Geng et al. |
| 2020/0100102 | A1 | 3/2020 | Xu et al. |

OTHER PUBLICATIONS

O-RAN.WG3.E2AP-v01.01.*
Intelligent O-RAN for Beyond 5G and 6G Wireless Networks.*
Czichy, "5G RAN optimization using the O-RAN software community's RIC (RAN Intelligent Controller),", Sep. 23, 2019.
Niknam et al., "Intelligent O-RAN for Beyond 5G and 6G Wireless Networks," May 17, 2020.
Li et al., "O-RAN Use Cases and Deployment Scenarios," O_RAN Alliance, Feb. 2020.
Gavrilovska et al., "From Cloud RAN to Open RAN," Wireless Personal Communications (2020) 113:1523-1539 https:/doi.org/10.1007/s11277-020-07231-3; Published online: Mar. 21, 2020; Springer Science+Business Media, LLC, part of Springer Nature 2020.
International Search Report dated Dec. 21, 2021, issued in International Application No. PCT/KR2021/011233.
O-RAN Alliance; O-RAN Working Group 3 Near-Real-time RAN Intelligent Controller E2 Service Model (E2SM) KPM; ORAN-WG3.E2SM-KPM-v01.00.00; Technical Specification; 2020.
O-RAN Alliance; O-RAN Working Group 3, Near-Real-time RAN Intelligent Controller, E2 Application Protocol (E2AP); O-RAN.WG3.E2AP-v01.01; Technical Specification; 2020.
European Partial Search Report dated Nov. 16, 2023; European Appln. No. 21858669.1-1215 / 4187966 PCT/KR2021011233.
Extended European Search Report dated Feb. 6, 2024; European Appln. No. 21858669.1-1215 / 4187966 PCT/KR2021011233.
Chinese Office Action dated Jul. 29, 2025, issued in Chinese Patent Application Serial No. 202180071756.3.

* cited by examiner

900

<table>
<tr><td rowspan="14">Per-Cell</td><td colspan="4">Cell Global ID</td></tr>
<tr><td rowspan="13">Per-SSB</td><td colspan="3">SSB ID</td></tr>
<tr><td rowspan="12">Per-UE ID</td><td colspan="2">UE ID</td></tr>
<tr><td rowspan="11">Per-DRB ID</td><td>DRB ID and/or LCG</td></tr>
<tr><td>5QI(SA) or QCI(NSA)</td></tr>
<tr><td>S-NSSAI</td></tr>
<tr><td>Monitored Occupied Buffer Duration (DL)</td></tr>
<tr><td>Monitored Data for IP throughput (DL)</td></tr>
<tr><td>Monitored Occupied Buffer Duration (UL)</td></tr>
<tr><td>Monitored Data for IP throughput (UL)</td></tr>
<tr><td>Monitored Latency (DL)</td></tr>
<tr><td>Monitored Latency (UL)</td></tr>
<tr><td>PRB usage (DL)</td></tr>
<tr><td>PRB usage (UL)</td></tr>
</table>

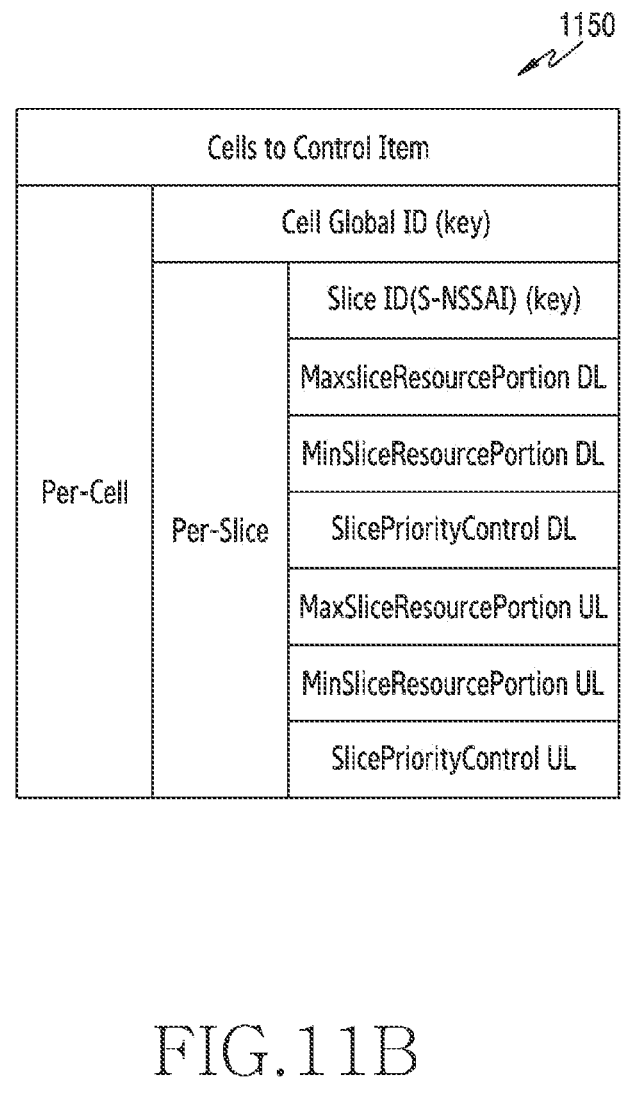

<table>
<tr><td colspan="3">Cells to Control Item</td></tr>
<tr><td rowspan="8">Per-Cell</td><td colspan="2">Cell Global ID (key)</td></tr>
<tr><td rowspan="7">Per-Slice</td><td>Slice ID(S-NSSAI) (key)</td></tr>
<tr><td>MaxsliceResourcePortion DL</td></tr>
<tr><td>MinSliceResourcePortion DL</td></tr>
<tr><td>SlicePriorityControl DL</td></tr>
<tr><td>MaxSliceResourcePortion UL</td></tr>
<tr><td>MinSliceResourcePortion UL</td></tr>
<tr><td>SlicePriorityControl UL</td></tr>
</table>

FIG.11B

METHOD AND DEVICE FOR MEASURING PERFORMANCE IN WIRELESS COMMUNICATION SYSTEM

CROSS-REFERENCE TO RELATED APPLICATION(S)

This application is a continuation application, claiming priority under § 365(c), of an International application No. PCT/KR2021/011233, filed on Aug. 23, 2021, which is based on and claims the benefit of a Korean patent application number 10-2020-0105679, filed on Aug. 21, 2020, in the Korean Intellectual Property Office, the disclosure of which is incorporated by reference herein in its entirety.

BACKGROUND

1. Field

The disclosure relates to an apparatus and a method for performance measurement for each terminal on an E2 interface in a radio access network, and resource management per slice of a base station. More particularly, the disclosure relates to an apparatus and a method for transferring a container-based measurement message when a service event for a base station conforming to open radio access network (O-RAN) specifications using an E2 message of a wireless communication system occurs.

2. Description of Related Art

To meet the demand for wireless data traffic having increased since deployment of 4th generation (4G) communication systems, efforts have been made to develop an improved 5th generation (5G) or pre-5G communication system. For example, a 5th generation (5G) mobile telecommunication system or pre-5G communication system is also called a “beyond 4G network” communication system or a “post long term evolution (LTE)” system.

The 5G communication system may be implemented in high frequency bands so as to accomplish higher data rates. To decrease propagation loss of the radio waves and increase the transmission distance in the high frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The 5G system, new radio or next radio (NR) is commercialized to satisfy demand for wireless data traffic, and provide a high data rate service to a user through the 5G system like 4G, and it is also predicted that wireless communication services for various purposes such as Internet of things and a service requiring high reliability for a specific purpose may be provided. Open radio access network (O-RAN) established by operators and equipment providers in a system where the current 4G communication system and the 5G system are mixed defines a new network element (NE) and an interface standard based on the existing the 3rd generation partnership project (3GPP) standard, and suggests an O-RAN structure.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for transmitting measurement information of a terminal unit level to a radio access network (RAN) intelligent controller (RIC) by an E2 node in a wireless communication system. Accordingly, a limitation in which analysis based on collective information at a cell or slice level should be made is resolved, and thus various pieces of service level information of terminal units receiving service across multiple cells may be analyzed so as to provide a function of monitoring the service level agreement (SLA) status per slice more precisely.

Another aspect of the disclosure is to provide an apparatus and a method for transmitting a message for controlling the resource allocation amount per network slice to an E2 node by the RIC. A resource control message for a network slice is required for a detailed service model required for real-time equipment control through the RIC.

Additional aspects will be set forth in part in the description which follows and, in part, will be apparent from the description, or may be learned by practice of the presented embodiments.

In accordance with an aspect of the disclosure, a method performed by an E2 node is provided. The method includes transmitting a radio access network (RAN) intelligent controller (RIC) indication message to an RIC, wherein the RIC indication message includes an E2 service model (E2SM)-key performance measurement (KPM) indication message format 1 and an E2SM-KPM indication message format 2 for key performance measurement (KPM), wherein the E2SM-KPM indication message format 1 does not include terminal identification information, and wherein the E2SM-KPM indication message format 2 includes terminal identification information.

In accordance with another aspect of the disclosure, a method performed by a radio access network (RAN) intelligent controller (RIC) is provided. The method includes transmitting an RIC indication message to an E2 node, wherein the RIC indication message includes an E2 service model (E2SM)-KPM indication message format 1 and an E2SM-KPM indication message format 2 for key performance measurement (KPM), wherein the E2SM-KPM indication message format 1 does not include terminal identification information, and wherein the E2SM-KPM indication message format 2 includes terminal identification information.

In accordance with another aspect of the disclosure, a method performed by an E2 node is provided. The method includes receiving a radio access network (RAN) intelligent controller (RIC) control message from an RIC, wherein the RIC control message includes slice identification information and control information on a network slice corresponding to the slice identification information.

In accordance with another aspect of the disclosure, a method performed by an E2 node is provided. The method includes receiving a radio access network (RAN) intelligent controller (RIC) control message from an RIC, wherein the RIC control message includes slice identification information and control information on a network slice corresponding to the slice identification information.

In accordance with another aspect of the disclosure, an apparatus of an E2 node is provided. The apparatus includes at least one transceiver and at least one processor, wherein the at least one processor is configured to perform at least one method of the E2 node described herein.

In accordance with another aspect of the disclosure, an apparatus of a radio access network (RAN) intelligent controller (RIC) is provided. The apparatus includes at least one transceiver and at least one processor, wherein the at least one processor is configured to perform at least one method of the RIC described herein.

In accordance with another aspect of the disclosure, a method performed by an E2 node is provided. The method includes transmitting an indication message to a radio access network (RAN) intelligent controller (RIC), wherein the indication message includes a measurement container, the measurement container includes measurement information for each bearer of each user equipment (UE) of a cell, and the measurement information includes information on at least one of a physical resource block (PRB) usage, a throughput, and a latency.

In accordance with another aspect of the disclosure, a method performed by an E2 node is provided. The method includes receiving a control request message (indication message) from a radio access network (RAN) intelligent controller (RIC), wherein the control request message may include an RIC control message, the RIC control message may include information for resource control per slice, and the information may include information on a radio resource portion and scheduling priority.

In accordance with another aspect of the disclosure, a method performed by a radio access network (RAN) intelligent controller (RIC) is provided. The method includes receiving an indication message from an E2 node, wherein the indication message includes a measurement container, the measurement container includes measurement information for each bearer of each user equipment (UE) of a cell, and the measurement information includes information on at least one of a PRB usage, a throughput, and a latency.

In accordance with another aspect of the disclosure, a method performed by a radio access network (RAN) intelligent controller (RIC) is provided. The method includes transmitting a control request message (indication message) to an E2 node, wherein the control request message includes an RIC control message, the RIC control message includes information for resource control per slice, and the information includes information on a radio resource portion and scheduling priority.

In accordance with another aspect of the disclosure, an apparatus of an E2 node is provided. The apparatus includes at least one transceiver and at least one processor, wherein the at least one processor is configured to transmit an indication message to a radio access network (RAN) intelligent controller (RIC), the indication message includes a measurement container, the measurement container includes measurement information for each bearer of each user equipment (UE) of a cell, and the measurement information includes information on at least one of a PRB usage, a throughput, and a latency.

In accordance with another aspect of the disclosure, an apparatus of an E2 node is provided. The apparatus includes at least one transceiver and at least one processor, wherein the at least one processor is configured to receive a control request message (indication message) from a radio access network (RAN) intelligent controller (RIC), the control request message includes an RIC control message, the RIC control message includes information for resource control per slice, and the information includes information on a radio resource portion and scheduling priority.

In accordance with another aspect of the disclosure, an apparatus of a radio access network (RAN) intelligent controller (RIC) is provided. The apparatus includes at least one transceiver and at least one processor, wherein the at least one processor is configured to receive an indication message from an E2 node, the indication message includes a measurement container, the measurement container includes measurement information for each bearer of each user equipment (UE) of a cell, and the measurement information includes information on at least one of a PRB usage, a throughput, and a latency.

In accordance with another aspect of the disclosure, an apparatus of a radio access network (RAN) intelligent controller (RIC) is provided. The apparatus includes at least one transceiver and at least one processor, wherein the at least one processor is configured to transmit a control request message (indication message) to an E2 node, the control request message includes an RIC control message, the RIC control message includes information for resource control per slice, and the information includes information on a radio resource portion and scheduling priority.

An apparatus and a method according to various embodiments of the disclosure enable measurement information to be reported to an RIC through a container for performance measurement in an indication message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 9A and 9B illustrate examples of RIC indications according to various embodiments of the disclosure;

FIGS. 11A and 11B illustrate examples of RIC control messages according to various embodiments of the disclosure.

Throughout the drawings, it should be noted that like reference numbers are used to depict the same or similar elements, features, and structures.

DETAILED DESCRIPTION

Figure 1:
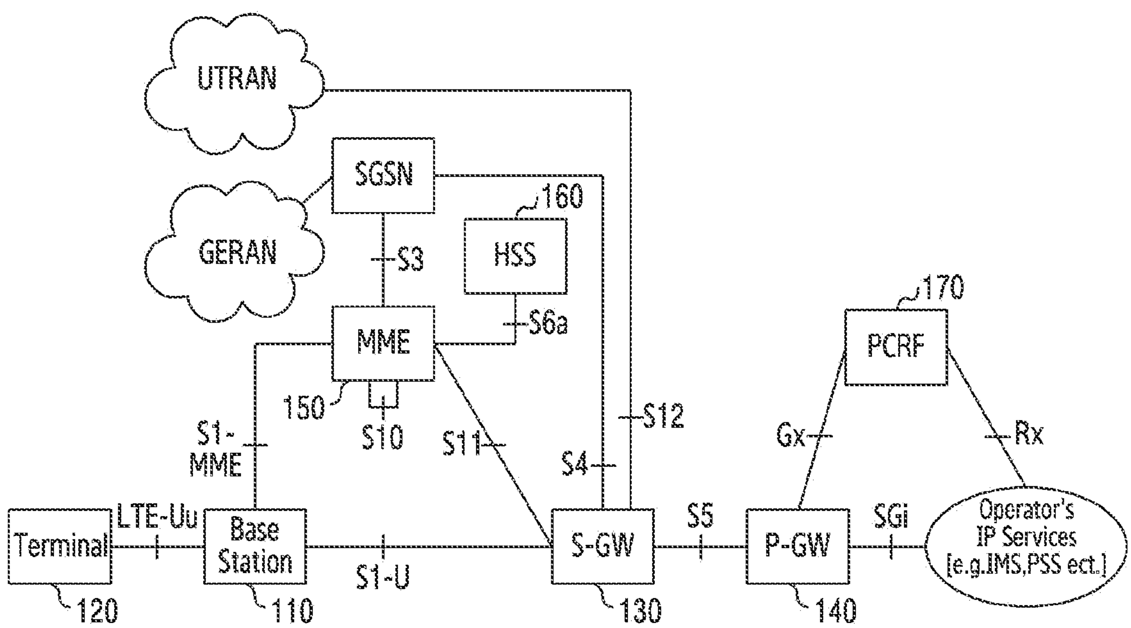
FIG. 1 illustrates an example of a 4th generation (4G) long-term evolution (LTE) core system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for performing a subscription procedure between an apparatus in a radio access network (RAN) and an apparatus controlling the RAN in a wireless communication system. Specifically, the disclosure relates to an apparatus and a method for performance measurement for each terminal on an E2 interface in a radio access network, and resource management per slice of a base station. The disclosure relates to an apparatus and a method for transferring a container-based measurement message when a service event for a base station conforming to open radio access network (O-RAN) specifications using an E2 message of a wireless communication system occurs.

In the following description, terms referring to signals, referring to channels, terms referring to control information, terms referring to network entities, terms referring to device elements, and the like are illustratively used for the sake of convenience. Therefore, the disclosure is not limited by the terms as used below, and other terms referring to subjects having equivalent technical meanings may be used.

As used in the disclosure, the expression "greater than" or "less than" is used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

In the disclosure, various embodiments will be described using terms employed in some communication standards (e.g., the 3rd generation partnership project (3GPP)), but they are only for the sake of illustration. The embodiments of the disclosure may also be easily applied to other communication systems through modifications.

As a 4th generation (4G)/5th generation (5G) communication system (e.g., new radio (NR)) is commercialized, a virtualized network requires a differentiated service support for users. Accordingly, open-radio access network (O-RAN) newly defines a radio unit (RU), a digital unit (DU), a central unit (CU)-control plane (CP), and a CU-user plane (UP), which are nodes configuring a base station and a 3GPP network entity (NE), as O (O-RAN)-RU, O-DU, O-CU-CP, and O-CU-UP respectively, and additionally standardizes a near-real-time (NRT) radio access network intelligent controller (RIC). The disclosure is to support an operator specific service model in an E2 interface in which a RIC requests a service from the O-DU, the O-CU-CP, or the O-CU-UP. Here, the O-RU, the O-DU, the O-CU-CP, and the O-CU-UP may be understood as objects configuring the RAN which may operate according to the O-RAN standard, and may be referred to as E2 nodes. An interface with objects constituting a RAN that can operate according to the O-RAN specifications between RIC and E2 nodes uses E2AP (application protocol).

The RIC is a logical node capable of collecting information on a cell site transmitted/received between a UE and the O-DU, the O-CU-CP, or the O-CU-UP. The RIC may be implemented in the form of a server centrally located in one physical location. The O-DU and the RIC, the O-CU-CP and the RIC, and the O-CU-UP and the RIC may be connected via Ethernet. To this end, an interface standard for communications between the O-DU and the RIC, between the O-CU-CP and the RIC, and between the O-CU-UP and the RIC are required, and a message standard such as E2-DU, E2-CU-CP, E2-CU-UP and a procedure between the O-DU and the RIC, the O-CU-CP and the RIC, and the O-CU-UP and the RIC are required to be defined. In particular, a virtualized network requires differentiated service support for users, and it is necessary to define functions of messages of E2-DU, E2-CU-CP and E2-CU-UP to support a service for wide cell coverage, by concentrating a call processing message/function generated in the O-RAN on the RIC.

The RIC may communicate with the O-DU, the O-CU-CP, and the O-CU-UP using the E2 interface, and may generate and transmit a subscription message to the O-DU, the O-CU-CP, and the O-CU-UP and thus configure an event occurrence condition. Specifically, the RIC may generate an E2 subscription request message and transfer the subscription request message to an E2 node (e.g., O-CU-CP, O-CU-UP, O-DU) so as to configure a call processing EVENT. In addition, after the EVENT configuration, the E2 node transfers a subscription request response message with respect to the transferred subscription request message to the RIC.

The E2 node may transmit the current state to the RIC through an E2 indication/report. The RIC may provide control for the O-DU, O-CU-CP, and O-CU-UP by using an E2 control message. Various embodiments of the disclosure propose an E2 indication message for transmission of UE-unit measurement information for each period configured in a subscription event condition in the O-DU. In addition, various embodiments of the disclosure propose a message for controlling a resource transmitted from the RIC to the O-DU.

FIG. 1 illustrates an example of a 4th generation (4G) long-term evolution (LTE) core system according to an embodiment of the disclosure.

Referring to FIG. 1, the LTE core system includes a base station 110, a terminal 120, a serving gateway (S-GW) 130, a packet data network gateway (P-GW) 140, a mobility management entity (MME) 150, a home subscriber server (HSS) 160, and a policy and charging rule function (PCRF) 170.

The base station 110 is a network infrastructure for providing radio access to the terminal 120. For example, the base station 110 is a device which performs scheduling by collecting status information such as a buffer status, an available transmission power, and a channel status of the terminal 120. The base station 110 has coverage defined as a specific geographic region based on a signal transmission distance. The base station 110 is connected to the MME 150 via an S1-MME interface. Besides the base station, the base station 110 may be referred to as an ‘access point (AP)’, an ‘evolved NodeB (e NodeB, eNB)’, a ‘wireless point’, a ‘transmission/reception point (TRP)’, or other term having the equivalent technical meaning thereof.

The terminal 120 is a device used by a user, and performs communication with the base station 110 through a radio channel. In some cases, the terminal 120 may be operated without a user’s involvement. That is, at least one of the terminal 120 and the S-GW 130 is a device which performs machine type communication (MTC), and may not be carried by the user. Besides the terminal, the terminal 120 may be referred to as a ‘UE’, a ‘mobile station’, a ‘subscriber station’, a ‘customer-premises equipment (CPE)’, a ‘remote terminal’, a ‘wireless terminal’, or a ‘user device’ or other term having the equivalent technical meaning thereof.

The S-GW 130 provides a data bearer, and generates or controls the data bearer under control of the MME 150. For example, the S-GW 130 processes a packet arriving from the base station 110 or a packet to be forwarded to the base station 110. In addition, the S-GW 130 may perform an anchoring role in handover of the terminal 120 between base stations. The P-GW 140 may function as a connection point to an external network (e.g., an Internet network). In addition, the P-GW 140 allocates an Internet protocol (IP) address to the terminal 120, and serves as an anchor for the S-GW 130. In addition, the P-GW 140 may apply quality of service (QoS) policy of the terminal 120, and manage account data.

The MME 150 manages mobility of the terminal 120. In addition, the MME 150 may perform authentication, bearer management, and the like on the terminal 120. That is, the MME 150 is responsible for mobility management and various control functions of the terminal. The MME 150 may interwork with a serving GPRS support node (SGSN).

The HSS 160 stores key information and a subscriber profile for the authentication of the terminal 120. The key information and the subscriber profile are transmitted from the HSS 160 to the MME 150 when the terminal 120 accesses the network.

The PCRF 170 defines a policy and a charging rule. The stored information is transferred from the PCRF 180 to the P-GW 140, and the P-GW 140 may control the terminal 120 (e.g., QoS management, charging, etc.) based on the information provided from the PCRF 170.

Carrier aggregation (hereinafter, refer to as ‘CA’) technology is a technology which combines a plurality of component carriers, and transmits and receives a signal by using the plurality of the component carriers at the same time, by one terminal, and thus increases frequency use efficiency in terms of the terminal or the base station. Specifically, according to the CA technology, the terminal and the base station may transmit and receive signals using a broadband by using the plurality of the component carriers in the uplink (UL) and the downlink (DL), and here the component carriers are located in different frequency bands respectively. Hereafter, the UL implies a communication link through which the terminal transmits a signal to the base station, and the DL implies a communication link through which the base station transmits a signal to the terminal. Here, the numbers of uplink component carriers and downlink component carriers may be different.

Dual connectivity or multi connectivity is a technology for increasing the frequency use efficiency in terms of the terminal or the base station, in which one terminal is connected to a plurality of different base stations and transmits and receives signals simultaneously using carriers within the plurality of the base stations located in different frequency bands. The terminal may be connected to a first base station (e.g., a base station which provides services using the LTE technology or the 4G mobile communication technology) and a second base station (e.g., a base station which provides services using the new radio (NR) technology or $5^{th}$ generation (5G) mobile communication technology at the same time to transmit and receive traffic. In this case, frequency resources used by each base station may be located in different bands. As such, the operation scheme based on the dual connectivity scheme of the LTE and the NR may be referred to as 5G non-standalone (NSA).

Figure 2A:
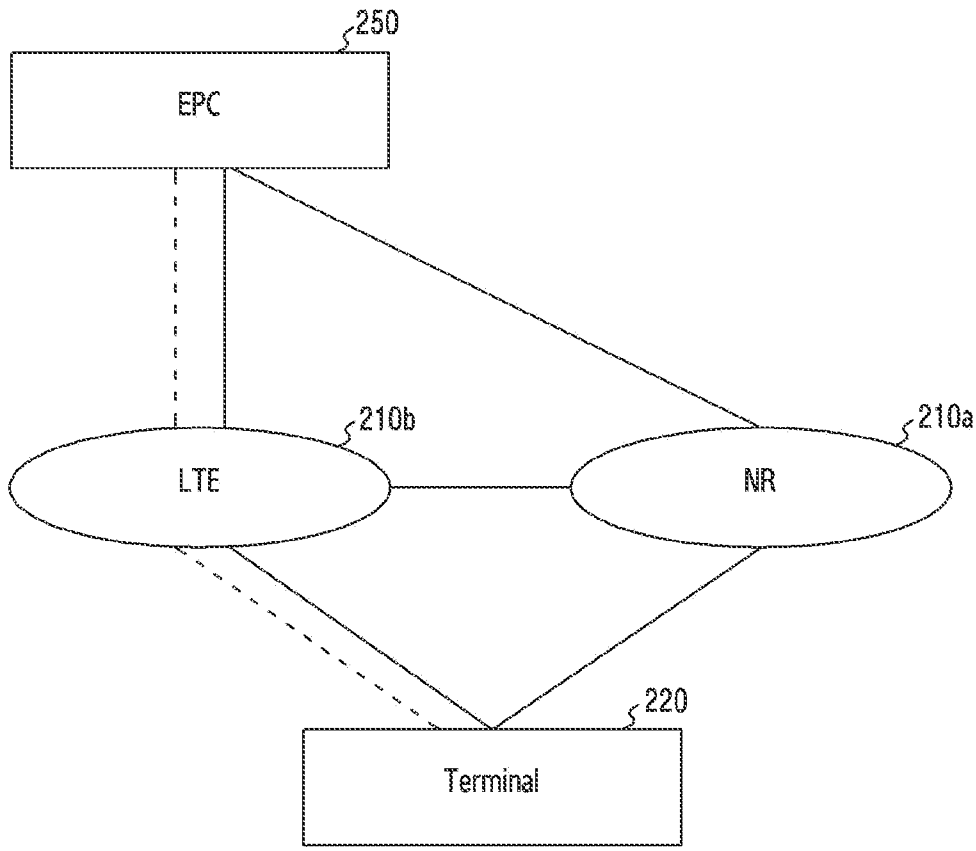
FIG. 2A illustrates an example of a 5th generation (5G) non-standard alone (NSA) system according to an embodiment of the disclosure.

FIG. 2A illustrates an example of a 5G NSA system according to an embodiment of the disclosure.

Referring to FIG. 2A, the 5G NSA system includes an NR RAN 210*a*, an LTE RAN 210*b*, a terminal 220, and an evolved packet core (EPC) 250. The NR RAN 210*a* and the LTE RAN 210*b* are connected to the EPC 250, and the terminal 220 may be served by any one or both of the NR RAN 210*a* and the LTE RAN 210*b* at the same time. The NR RAN 210*a* includes at least one NR base station, and the LTE RAN 210*b* includes at least one LTE base station. Herein, the NR base station may be referred to as a ‘5G node’, a ‘next generation node B (gNB)’ or other term having the equivalent technical meaning. In addition, the NR base station may have a structure divided into a central unit (CU) and a digital unit (DU), and the CU may also have a structure divided into a CU-control plane (CP) unit and a CU-user plane (UP) unit.

In the structure shown in FIG. 2A, the terminal 220 may perform radio resource control (RRC) access through a first base station (e.g., a base station belonging to the LTE RAN 210*b*), and may be served with functions (e.g., connection management, mobility management, etc.) provided in the control plane. In addition, the terminal 220 may receive additional radio resources for transmitting and receiving data through a second base station (e.g., a base station belonging to the NR RAN 210*a*). This dual connectivity technology using the LTE and the NR may be referred to as evolved universal terrestrial radio access (E-UTRA)-NR (EN)-dual connectivity (DC). Similarly, the dual connectivity technology in which the first base station uses the NR technology and the second base station uses the LTE technology is referred to as NR-E-UTRA (NE)-DC. In addition, various embodiments may be applied to the multi connectivity and the CA technology of various types. In addition, various embodiments may be applicable even if a first system using a first communication technology and a second system using a second communication technology are implemented in one device or if the first base station and the second base station are located at the same geographic location.

Figure 2B:
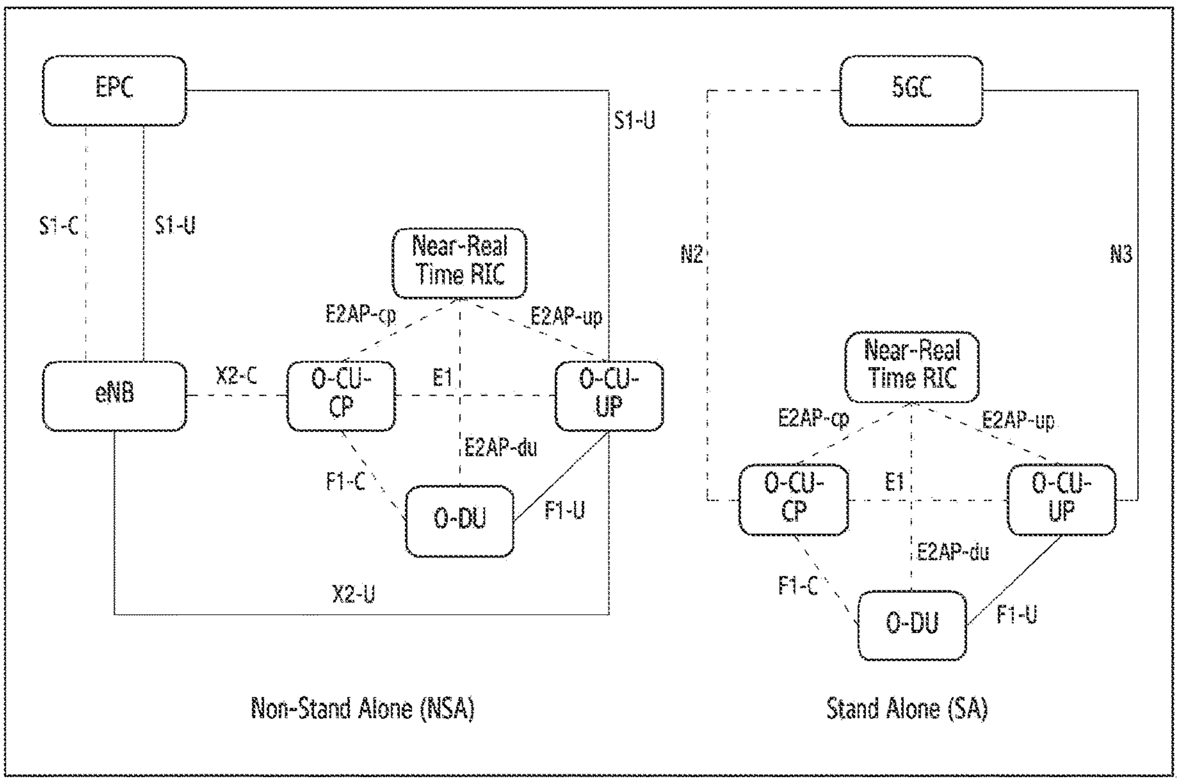
FIG. 2B illustrates an example of an architecture for O-RAN according to an embodiment of the disclosure.

FIG. 2B illustrates an architecture example for the O-RAN according to an embodiment of the disclosure. For the sake of E2-SM-key performance indicator (KPI) monitoring (KPIMON) of an E2 service model, an O-RAN non-standalone in the multi-connectivity operation using the E-UTRA and the NR radio access technology is considered, whereas the E2 node may be assumed to be in an O-RAN standalone mode.

Referring to FIG. 2B, in deployment of the O-RAN non-standalone mode, the eNB is connected with the EPC via an S1-C/S1-U interface, and is connected with the O-CU-CP via an X2 interface. The O-CU-CP for the deployment of the O-RAN standalone mode may be connected with a 5G core (5GC) via an N2/N3 interface.

Figure 3:
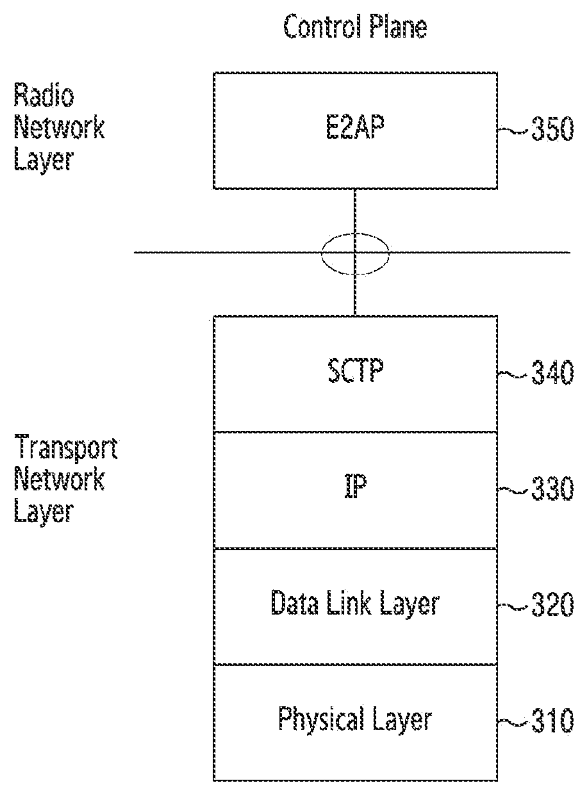
FIG. 3 illustrates a protocol stack of an E2 application protocol message in a radio access network according to an embodiment of the disclosure.

FIG. 3 illustrates a protocol stack of an E2 application protocol message in a radio access network according to an embodiment of the disclosure.

Referring to FIG. 3, a control plane includes a transport network layer and a radio network layer. The transport network layer includes a physical layer 310, a data link layer 320, an Internet protocol (IP) layer 330, and a stream control transmission protocol (SCTP) layer 340.

The radio network layer includes an E2AP 350. The E2AP 350 is used to transfer a subscription message, an indication message, a control message, a service update message, and a service query message, and is transmitted in a higher layer of the SCTP layer 340 and the IP layer 330.

Figure 4:
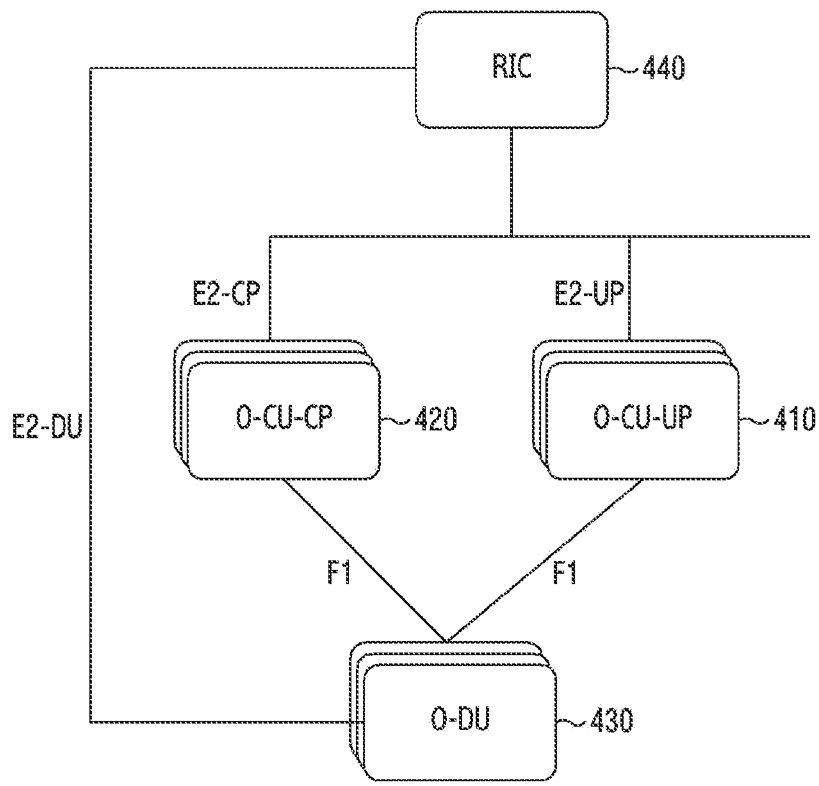
FIG. 4 illustrates an example of a connection between a base station and a radio access network intelligence controller (RIC) in a radio access network according to an embodiment of the disclosure.

FIG. 4 illustrates an example of a connection between a base station and an RIC in a radio access network according to an embodiment of the disclosure.

Referring to FIG. 4, an RIC 440 is connected to an O-CU-CP 420, an O-CU-UP 410, and an O-DU 430. The RIC 440 is a device for controlling an RAN node (or a device for performing an RAN function, for example, the O-CU-CP 420, the O-CU-UP 410, and the O-DU 430). The RIC 440 may be defined as a deice for customizing RAN functionality for a new service or regional resource optimization. The RIC 440 may provide functions such as network intelligence (e.g., policy enforcement, handover optimization), resource assurance (e.g., radio-link management, advanced self-organized-network (SON)), resource control (e.g., load balancing, slicing policy). The RIC 440 may communicate with the O-CU-CP 420, the O-CU-UP 410, and the O-DU 430. The RIC 440 may be connected to each node via E2-CP, E2-UP, and E2-DU interfaces. In addition, the interface between the O-CU-CP and the DU and between the O-CU-UP and the DU may be referred to as an F1 interface. In the following description, the DU and the O-DU, the CU-CP and the O-CU-CP, and the CU-UP and the O-CU-UP may be used interchangeably.

While FIG. 4 illustrates one RIC 440, a plurality of RICs may exist according to various embodiments. The plurality of the RICs may be implemented with a plurality of hardware located at the same physical location or may be implemented through virtualization using single hardware.

Figure 5:
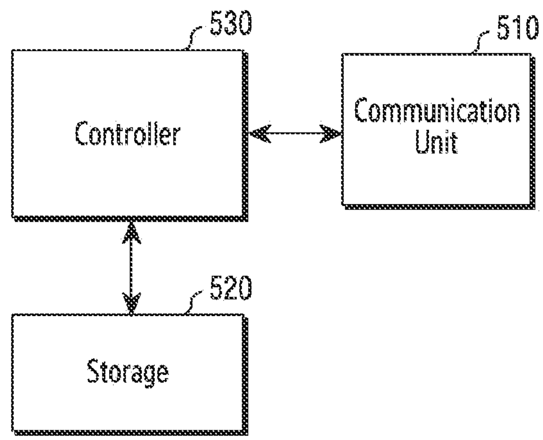
FIG. 5 illustrates a configuration of an apparatus in a radio access network according to an embodiment of the disclosure.

FIG. 5 illustrates a configuration of a device according to an embodiment of the disclosure. The structure illustrated in FIG. 5 may be understood as a configuration of a device having at least one function of the RIC, the O-CU-CP, the O-CU-UP, and the O-DU of FIG. 5. A term such as '~unit' or '~er' used hereafter indicates a unit for processing at least one function or operation, and may be implemented using hardware, software, or a combination of hardware and software.

Referring to FIG. 5, a core network device includes a communication unit 510, a storage 520 (e.g., a memory), and a controller 530.

The communication unit 510 provides an interface for performing communication with other devices in the network. That is, the communication unit 510 converts a bit string transmitted from the core network device to other device into a physical signal, and converts a physical signal received from other device into a bit string. That is, the communication unit 510 may transmit and receive signals. Accordingly, the communication unit 510 may be referred to as a modem, a transmitter, a receiver, or a transceiver. In this case, the communication unit 510 enables the core network device to communicate with other devices or systems via a backhaul connection (e.g., wired backhaul or wireless backhaul) or over the network.

The storage 520 stores data such as a basic program, an application program, and setting information for the operations of the core network device. The storage 520 may include a volatile memory, a nonvolatile memory, or a combination of a volatile memory and a nonvolatile memory. The storage 520 provides the stored data according to a request of the controller 530.

The controller 530 controls general operations of the core network device. For example, the controller 530 transmits and receives signals through the communication unit 510. In addition, the controller 530 records and reads data in and from the storage 520. To this end, the controller 530 may include at least one processor. According to various embodiments, the controller 530 may control the device to carry out operations according to various embodiments explained in the disclosure.

Figure 6:
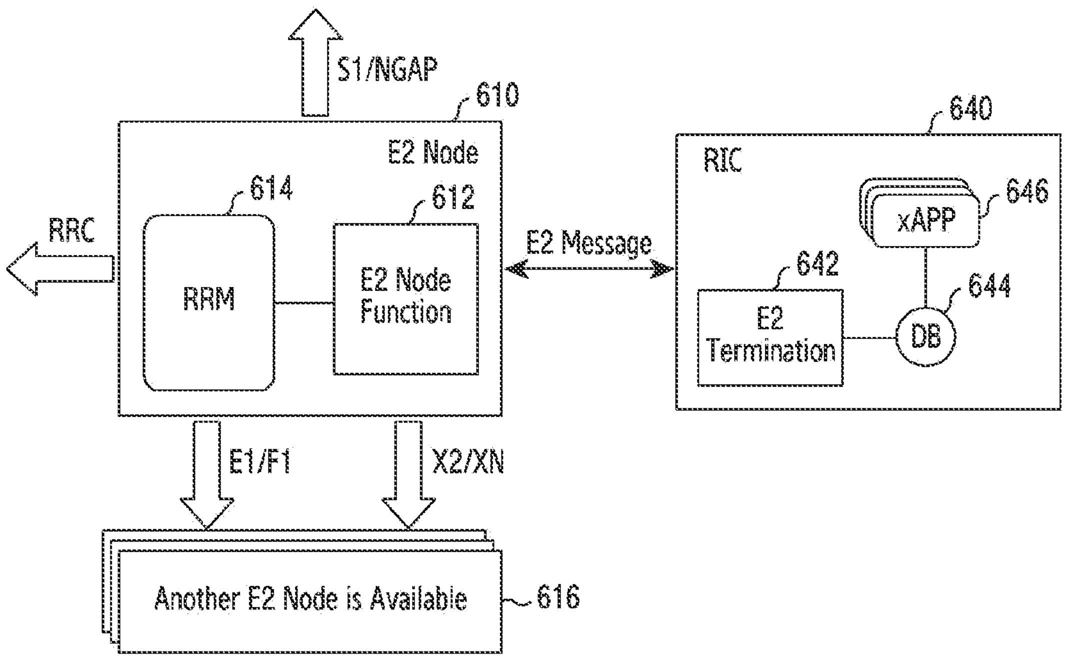
FIG. 6 illustrates logical functions related to an E2 message of an E2 node and an RIC in a radio access network according to an embodiment of the disclosure.

FIG. 6 illustrates logical functions related to E2 messages of an E2 node and an RIC in a radio access network according to an embodiment of the disclosure.

Referring to FIG. 6, an RIC 640 and an E2 node 610 may transmit or receive an E2 message with each other. For example, the E2 node 610 may be an O-CU-CP, an O-CU-UP, an O-DU, or a base station. A communication interface of the E2 node may be determined according to the type of the E2 node 610. For example, the E2 node 610 may communicate with another E2 node 616 through the E1 interface or the F1 interface. Alternatively, for example, the E2 node 610 may communicate with the E2 node 616 through an X2 interface or an XN interface. Alternatively, for example, the E2 node 610 may perform communication through an S1 interface or a next generation application protocol (NGAP) interface (i.e., an interface between a next generation (NG) RAN node and an access & mobility management function (AMF)).

The E2 node 610 may include an E2 node function 612. The E2 node function 612 is a function corresponding to a specific xApp (e.g., application software (S/W)) 646 installed in the RIC 640. For example, in the KPI monitor, KPI monitor collection S/W may be installed in the RIC 640, and the E2 node 610 may include the E2 node function 612 which generates KPI parameters, and then delivers an E2 message including the KPI parameters to an E2 termination 642 located at the RIC 640. The E2 node 610 may include a radio resource management (RRM) 614. The E2 node 610 may manage resources provided to the radio network for the terminal.

The E2 termination 642 located in the RIC 640, which is the termination of the RIC 640 for the E2 message, may perform a function of interpreting the E2 message transferred by the E2 node 610 and then transferring the same to the xApp 646. A database (DB) 644 located in the RIC 640 may be used for the E2 termination 642 or the xApp 646. The E2 node 610 shown in FIG. 6 is a termination of at least one interface, and may be understood as a termination of messages transmitted to a terminal, a neighbor base station, and a core network.

Figure 7:
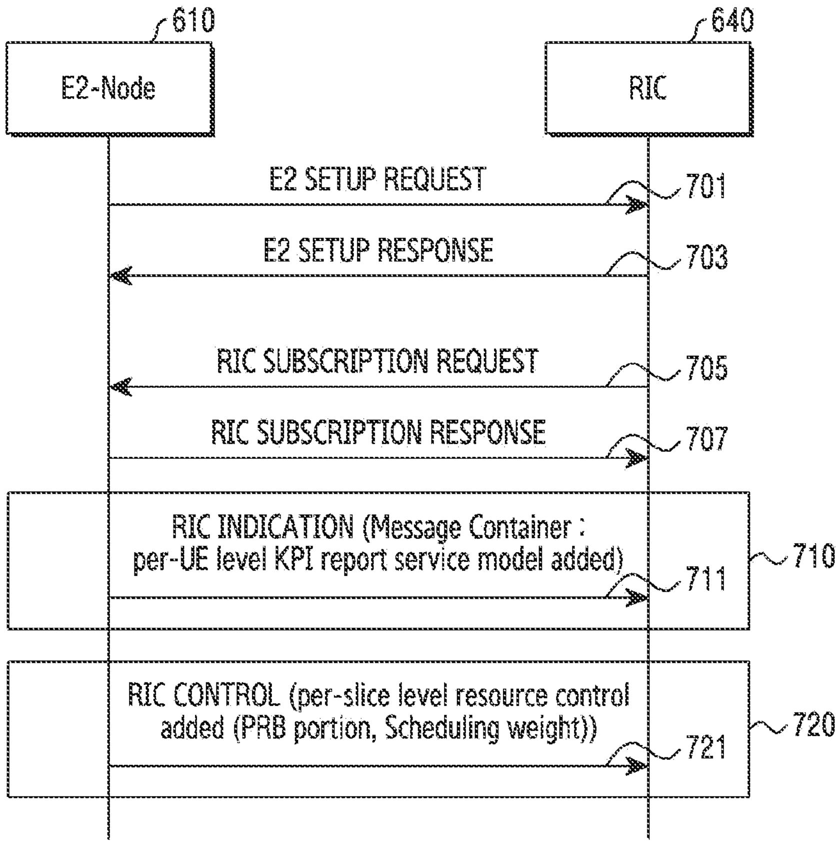
FIG. 7 illustrates an example of a signaling procedure between an E2 node and an RIC according to an embodiment of the disclosure.

FIG. 7 illustrates an example of a signaling procedure between an E2 node and an RIC according to an embodiment of the disclosure. Specifically, FIG. 7 illustrates a setup procedure and an RIC subscription message transfer procedure of E2 I/F between the E2 node and the RIC. In addition, FIG. 7 illustrates a procedure of transferring an RIC indication message and an RIC control message.

Referring to FIG. 7, the E2 node 610 may transmit an E2 setup request message to the RIC 640 in operation 701. An E2 NODE FUNCTION function located in the E2 node 610 finds the RIC 640 by using an RIC IP address which is configured as operation-administration-maintenance (OAM) and transmits the E2 SETUP REQUEST message. The E2 SETUP REQUEST message includes information relating to the function of the RAN supported by the E2 node 610 (e.g., RAN Function Definition), E2 node ID information, and the like. The RAN function definition value is a value configured as the OAM. For example, the RAN function definition value may include a STYLE ID value. The RIC 640 may receive information of the value configured as the OAM and determine which call processing function the E2 node 610 supports based on the RAN function definition value.

In operation 703, the RIC 640 may receive an E2 SETUP RESPONSE message from the E2 node 610. The RIC 640 may determine whether acceptance of the E2 SETUP REQUEST message transmitted by the E2 node 610 is possible. When the E2 SETUP REQUEST message is acceptable, the RIC 640 may transmit the E2 SETUP RESPONSE message to the E2 node 610.

In operation 705, the RIC 640 may transmit a subscription request (RIC SUBSCRIPTION REQUEST) message to the E2 node. A specific xApp located in the RIC 640 requests the RIC E2 termination function to subscribe for a specific RAN Function Definition function supported by E2. According to an embodiment, as shown in FIG. 7, the transmission of the SUBSCRIPTION REQUEST message and the E2 SETUP RESPONSE message may be transmitted separately. According to another embodiment, the SUBSCRIPTION REQUEST message of operation 705 may be included in the E2 SETUP RESPONSE message of operation 703 and transmitted together.

In operation 707, the E2 node 610 may transmit a subscription request response (RIC SUBSCRIPTION RESPONSE) to the RIC 640. The E2 node function of the E2 node 610 may decode the subscription request message. The E2 node function of the E2 node 610 may successfully configure the event condition requested by the RIC 640 to the E2 node function and then transfer a subscription response to the subscription request to the RIC 640 that the event trigger condition is successfully configured.

In operation 711, the E2 node 610 may transmit an E2 RIC indication message to the RIC 640. The E2 node 610 and the RIC 640 may perform an RIC indication procedure 710. For example, when a specific event condition occurs, the E2 node 610 may transfer the E2 RIC indication message to the RIC 640. According to embodiments of the disclosure, the RIC indication message may include a KPI report in UE units. According to an embodiment, a message container of the RIC indication message may include a KPI reporting service model in units of UEs. Examples of specific information included in the RIC indication message are described through FIGS. 8, 9A, and 9B.

In operation 721, the RIC 640 may transmit an E2 RIC control message to the E2 node 610. The E2 node 610 and the RIC 640 may perform an RIC control procedure 720. The RIC 640 may configure resource control of the E2 node 610 by transmitting an R2 control message to the E2 node 610, for a control procedure of the E2 node. According to the embodiments of the disclosure, the RIC control message may include configuration for resource control in slice units. According to an embodiment, the RIC control message may configure a PRB part and a scheduling weight per slice. Examples of specific information included in the RIC control message are described with reference to FIGS. 10, 11A, and 11B.

In FIG. 7, the SET UP procedure, the RIC subscription procedure, the RIC indication message transmission procedure, and the RIC control message transmission procedure are sequentially described, but various embodiments of the disclosure are not limited to the above-described order and procedures. That is, in some embodiments, the E2 node and the RIC may independently perform the E2 setup procedure of operations 701 through 703. In some embodiments, the E2 node and the RIC may independently perform the subscription procedure of operations 705 through 707. Meanwhile, according to another embodiment, the E2 setup response message may include the subscription request message, as described above. In some embodiments, the E2 node and the RIC may independently perform the RIC indication procedure of operation 710. Further, in some embodiments, the E2 node and the RIC may independently perform the RIC indication procedure of operation 711. In addition, the E2 node and the RIC may perform at least some of the above-described procedures together or separately.

Figure 8:
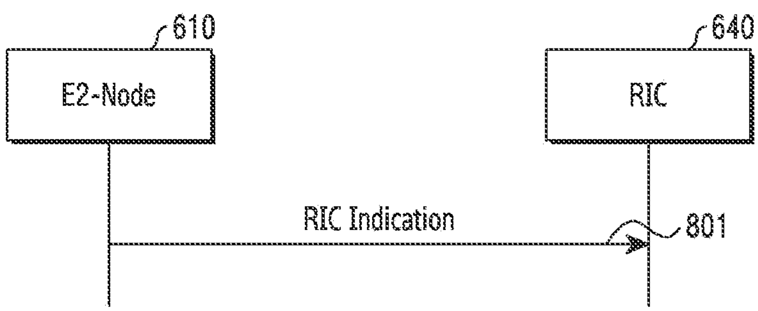
FIG. 8 illustrates an example of an RIC indication procedure according to an embodiment of the disclosure.

FIG. 8 illustrates an example of an RIC indication procedure according to an embodiment of the disclosure. The RIC indication procedure may include a transmission procedure of the RIC indication.

Referring to FIG. 8, in operation 801, the E2 node may transmit an RIC indication message to the RIC. The RIC indication procedure is to transfer a report-related message to an NRT (near-RT) RIC corresponding to a successful RIC subscription procedure and a corresponding event trigger detection and/or insert an RIC service thereto. An information element (IE) of an E2 indication message may be displayed as shown in Table 1 below.

TABLE 1

| IE/Group Name | Presence | Range | IE type and reference | Semantics description | Criticality | Assigned Criticality |
|---|---|---|---|---|---|---|
| Message Type | M | | 9.2.3 | | YES | reject |
| RIC Request ID | M | | 9.2.7 | | YES | reject |
| RAN Function ID | M | | 9.2.8 | | YES | reject |
| RIC Action ID | M | | 9.2.10 | | YES | reject |
| RIC Indication SN | O | | 9.2.14 | | YES | reject |
| RIC Indication Type | M | | 9.2.15 | | YES | reject |
| RIC Indication Header | M | | 9.2.17 | | YES | reject |
| RIC Indication message | M | | 9.2.16 | | YES | reject |
| RIC Call process ID | O | | 9.2.18 | | YES | reject |

For the numbers listed in 'IE type and reference' of Table 1, documents of "ORAN WG3, O-RAN Working Group 3, Near-Real-time RAN Intelligent Controller, E2 Application Protocol (E2AP)" may be referred to.

The first IE is a message type and has a unique value for each E2 message. The second IE an RIC REQUEST ID and designates a specific xApp. The third IE is an E2 NODE FUNCTION ID, and is a delimiter that distinguishes whether the E2 node is an eNB, O-DU, O-CU-CP, or O-CU-UP. The fourth IE is a delimiter for distinguishing an action when an additional operation of the RIC occurs. The fifth IE is a sequence number for ensuring a sequenced operation when an additional operation of the RIC occurs. The sixth IE is RIC INDICATION TYPE, and designates whether the occurrence of INDICATION in the E2 node is a REPORT of a specific process or an addition to the message of an existing process.

The seventh identifier is the header of the RIC INDICATION message. For details of the header, the RIC INDICATION HEADER defined in the following ORAN-WG3.E2SM-KPI standard may be referred to. Here, the slice ID is configured by single-network slice selection assistance information (S-NSSAI).

TABLE 2

8.2.1.3 RIC INDICATION HEADER
This information element is part of the RIC INDICATION message sent by the E2 Node to the Near-RT RIC node and is required for REPORT action.
Direction: E2 Node → NEAR-RT RIC.

| IE/Group Name | Presence | Range | IE type and reference | Semantics description |
|---|---|---|---|---|
| CHOICE Format | | | | |
| >E2SM-KPM Indication Header Format 1 | M | | 8.2.1.3.1 | |

8.2.1.3.1 E2SM-KPM Indication Header Form at 1

| IE/Group Name | Presence | Range | IE type and reference | Semantics description |
|---|---|---|---|---|
| KPM Node ID | O | | 8.3.20 | |
| Cell Global ID | O | | 8.3.32 | |
| PLMN ID | O | | Served PLMN information [8.3.32] | |
| Slice ID | O | | S-NSSAI [8.3.31] | |
| 5QI | O | | INTEGER (0 . . . 255, . . . ) | 5QI value |
| QCI | O | | INTEGER (0 . . . 255, . . . ) | QCI value |

The eighth identifier is an RIC indication message, and may include container details of a measurement report proposed in the disclosure. The RIC indication message may be configured as shown in the table below.

TABLE 3

| IE/Group Name | Presence | Range | IE type and reference | Semantics description |
|---|---|---|---|---|
| RIC TYPE ID | M | | 8.3.5 | |
| Performance Measurement Container | O | | 8.3.21 | |
| RAN Container | O | | 8.3.27 | |

According to various embodiments, the RIC indication message may include an RIC type. RIC Type ID is a type of message, and only one is defined in the current standard. E2 Node ID defines an E2 node that performs indication. The current standard defines global gNB ID, gNB-CU-UP, gNB-DU ID, global en-gNB ID (gNB connected to EPC), Global ng-eNB ID (eNB connected to 5GC), and global eNB ID. Cell global ID is the information of a cell for which measurement is collected, and public land mobile network (PLMN) ID is an operator ID for which measurement is collected. Slice ID is an ID for slice when the E2 node supports standalone, and 5QI is an ID for defining QoS when the E2 node supports a standalone mode. A QoS class identifier (QCI) is a QoS ID that is used in a limited manner when the E2 node supports a non-standalone mode.

Figure 9B:
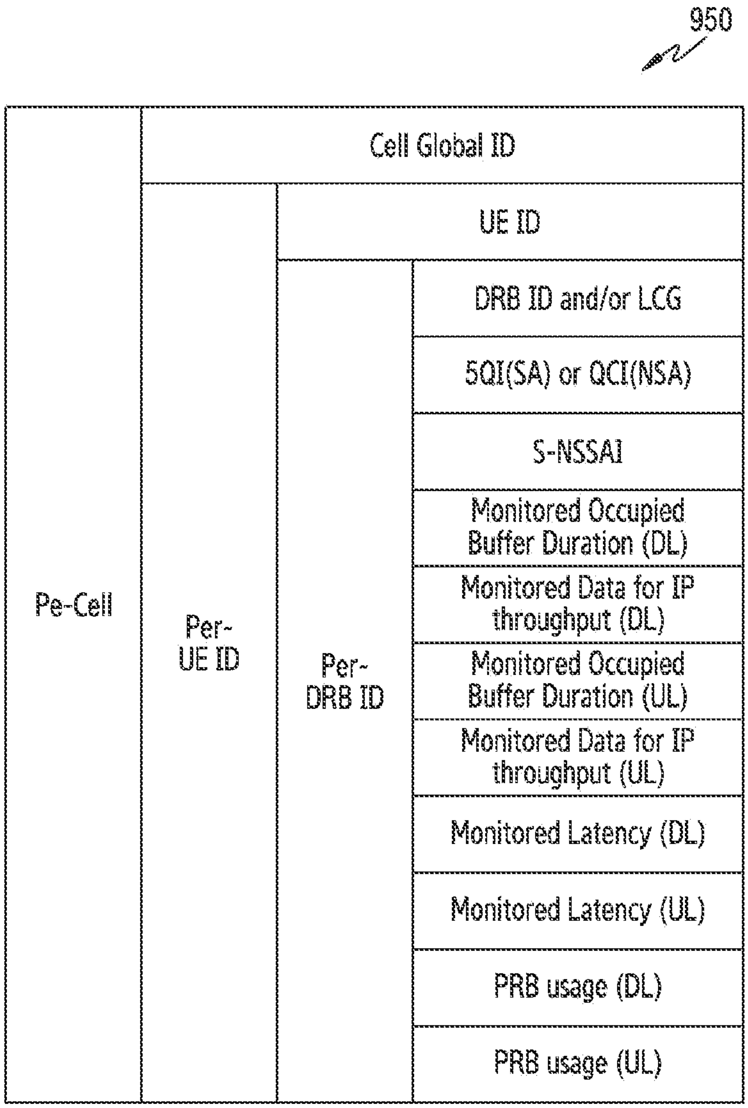

In addition, the RIC indication message may include details of a container (e.g., performance measurement container). In FIGS. 9A and 9B, examples of details of a container transmitted through an indication message in an O-DU according to embodiments of the disclosure are described. On the other hand, in order to describe the embodiments of the disclosure, in some embodiments, information transfer through a container information element (IE) is described. However, transmission of key performance measurements by carrying the same in a corresponding format directly without including a container may also be understood as an embodiment of the disclosure. That is, identification of an individual node (e.g., terminal) in the same format as well as transfer through a container for each E2 node may be understood as an embodiment of the disclosure.

According to various embodiments of the disclosure, the RIC indication message may include information for improved quality measurement compared to the existing KPI monitoring. The RIC indication message may include measurements in units of UE or at the bearer (e.g., data radio bearer (DRB)) level of the UE and reporting thereof. For example, the RIC indication message may be configured as shown in Table 4 below.

TABLE 4

8.2.1.4 RIC INDICATION MESSAGE IE
This information element is part of the RIC INDICATION message sent by the E2 Node to the Near-RT RIC node and is required for REPORT action.
Direction: E2 Node → NEAR-RT RIC.

| IE/Group Name | Presence | Range | IE type and reference | Semantics description |
|---|---|---|---|---|
| RIC Style Type | M | | 8.3.3 | |
| CHOICE Format | | | | |
| >E2SM-KPM Indication Message Format 1 | M | | 8.2.1.4.1 | |
| >E2SM-KPM Indication Message Format 2 | M | | 8.2.1.4.2 | |

8.2.1.4.1 E2SM-KPM Indication Message Format 1

| IE/Group Name | Presence | Range | IE type and reference | Semantics description |
|---|---|---|---|---|
| Sequence of PM Containers | | 1 . . . <maxofContainers> | | |
| Performance Measurement Container | O | | 8.3.21 | |
| >RAN Container | O | | 8.3.27 | |

| Range bound | Explanation |
|---|---|
| maxofContainers | Maximum no. of Performance Measurement Container. Value is 8. |

8.2.1.4.2 E2SM-KPM Indication Message Format 2

| IE/Group Name | Presence | Range | IE type and reference | Semantics description |
|---|---|---|---|---|
| Sequence of PM Containers | | 1 . . . <maxofContainers> | | |
| >Performance Measurement Container 2 | O | | 8.3.X | |
| >RAN Container | O | | 8.3.27 | |

TABLE 4-continued

| Range bound | Explanation |
|---|---|
| maxofContainers | Maximum no. of Performance Measurement Container. Value is 8. |

8.3.21 Performance Measurement Container
This IE indicates the RAN Container lists.

| IE/Group Name | Presence | Range | IE type and reference | Semantics description |
|---|---|---|---|---|
| CHOICE RAN Container | M | | | |
| >O-DU Performance Measurement Container | O | | 8.3.21a | |
| > O-CU-CP Performance Measurement Container | O | | 8.3.21b | |
| > O-CU-UP Performance Measurement Container | O | | 8.3.21c | |

8.3.34 Performance Measurement Container 2
This IE indicates the RAN Container lists for per-UE level KPI monitoring

| IE/Group Name | Presence | Range | IE type and reference | Semantics description |
|---|---|---|---|---|
| CHOICE RAN Container 2 | M | | | |
| >O-DU Performance Measurement Container 2 | O | | 8.3.34a | |
| > O-CU-CP Performance Measurement Container 2 | O | | 8.3.34b | |
| > O-CU-UP Performance Measurement Container 2 | O | | 8.3.34c | |

Referring to Table 4, it may be identified that E2SM KPM indication message format 1 does not include UE identification information, whereas for measurement information reporting in UE units, E2SM KPM indication message format 2 includes UE identification information.

According to an embodiment, the RIC indication message may further include an IE for indicating a new format (E2SM-KPM indication message format 2) compared to an existing format (e.g., E2SM-KPM indication message format 1). For example, the new format may refer to paragraph 8.2.1.4.2 above.

According to an embodiment, in this case, in the IE of the new format, 'performance measurement container 2' different from the existing performance measurement container may be defined. Paragraph 8.3.34 may be referred to for 'performance measurement container 2'. 'performance measurement container 2' is only a name to be distinguished from the existing 'performance measurement container', and is not construed as limiting the embodiment of the disclosure. That is, 'performance measurement container 2' may be replaced by a parameter name for performing the same function. Meanwhile, unlike Table 3 above, 'performance measurement container 2', which will be described later, is replaced by a method in which additional IEs are configured in detail in the existing performance measurement container may also be understood as an embodiment of the disclosure.

Referring to paragraph 8.3.34 above, 'performance measurement container 2' may include at least one of a performance measurement container of the O-DU, a performance measurement container of the O-CU-CP, and a performance measurement container of the O-CU-UP.

The ninth delimiter is the RIC call process ID, and is a delimiter that allows the E2 node and the RIC to distinguish specific event behavior from each other.

The E2 node may carry a container (e.g., a measurement report) related to performance measurement in the RIC indication message and transmit the same to the RIC. The RIC indication message according to various embodiments may include a container of a format determined according to the type of the E2 node (e.g., O-DU, O-CU-UP, O-CU-CP). For example, as in paragraph 8.3.34 of Table 4, the RIC indication message may include at least one of a performance measurement container of O-DU, a performance measurement container of O-CU-CP, and a performance measurement container of O-CU-UP.

FIGS. 9A and 9B illustrate examples of RIC indications according to various embodiments of the disclosure. In FIGS. 9A and 9B, examples of containers transmitted from the O-DU to the RIC are shown. Referring to FIGS. 9A and 9B, among E2 message containers proposed in the disclosure, a message container that is carried through an E2 indication message and transmitted from the O-DU to the RIC is described.

Referring to FIG. 9A, a message 900 may include a cell ID. According to an embodiment, the message 900 may include a DU ID (not shown). The DU-ID is at the top of the message structure. The DU ID refers to a specific DU. Since a cell global ID is located lower than the DU ID, the E2 node (DU) may report information on a specific cell to the RIC for each DU through a message. The RIC may receive reporting of a status for each synchronization signal block (SSB) (or referred to as an SS/physical broadcast channel (PBCH) block) defined in NR in a specific cell, that is, for each beam, based on an allocated UE list. The cell measurement information may be configured to include measurement information on one or more SSBs related to a corresponding cell. Each SSB may correspond to one or more UEs. In addition, each UE may correspond to one or more data radio bearers (DRBs). That is, the UE may have a plurality of DRBs. The E2 node (DU) may transmit, to the RIC, a report including at least one of a time during which a buffer was filled and the size of data processed while the buffer is occupied, a downlink/uplink-specific latency, and a PRB usage in order to identify the service status of the terminal in the corresponding DRB unit. In other words, the E2 node (DU) may be configured to report the service status for each individual UE.

Referring to FIG. 9B, the message 900 may include a cell ID. According to an embodiment, the message 900 may include a DU ID (not shown). The DU-ID is at the top of the message structure. The DU ID refers to a specific DU. Since a cell global ID is located lower than the DU ID, the E2 node (DU) may report information on a specific cell to the RIC for each DU through a message. Unlike the message 900, a message 950 may not include an indicator of an intermediate level configured in SSB units. That is, the cell measurement information may be configured to include measurement information about one or more UEs belonging to a corresponding cell.

In FIGS. 9A and 9B, examples in which measurement information in UE units and DRBs units is configured in cell units or lower units have been described. However, this is only an example for specifying units of cells or lower units, and embodiments of the disclosure are not limited to the message format illustrated in FIGS. 9A and 9B. According to an embodiment, as an example of the measurement information, the SSB units may be included in per-UE ID or thereunder. In addition, according to an embodiment, in the examples shown in FIG. 9A, only the measurement in SSB units and UE units is configured in cells or thereunder, and the measurement in DRB units may be omitted. In addition, according to an embodiment, in the examples shown in FIG. 9B, only the measurement in UE units is configured in cells or thereunder, and the measurement in the DRB units may be omitted. According to embodiments of the disclosure, each message may include a UE ID, that is, UE identification information in order to indicate the measurement in UE units. The UE ID, that is, UE identification information may be configured as a global identifier. The UE ID may be configured for each E2 node so as to distinguish a UE per cell in the RAN. The UE ID information may depend on the type of E2 node (gNB, eNB, DU, CU-CP, or CU-UP) according to an embodiment. For example, the UE ID is distinguished by RAN units, and thus may include the RAN UE ID. Further, for example, the UE ID may include a global identifier.

Exemplarily, the message 900 of FIG. 9A may be configured as shown in the table below. As examples of paragraph 8.3.34a mentioned in Table 4, the following Tables 5, 7, 9, and 11 may be exemplified. Measurement information in the RIC indication message may include an information format configured in units of UE and DRB as well as in units of SSB.

Exemplarily, the message 950 of FIG. 9B may be configured as shown in the table below. As examples of paragraph 8.3.34a mentioned in Table 4, the following Tables 6, 8, 10, and 12 may be exemplified. Compared to FIG. 9A, the SSB unit may be omitted. Accordingly, the measurement information in the message may include an information format consisting of UE units and DRB units without SSB units compared to Table 5, Table 7, Table 9, and Table 11.

8.3.34a O-DU Performance Measurement Container 2

This IE defines per DU measurement performance measurement container IE

A merged format that allows simultaneous reporting per DRB ID and logical channel group (LCG) ID

TABLE 5

| IE/Group Name | Presence | Range | IE type and reference | Semantics description |
|---|---|---|---|---|
| CellResourceReportList | | 1 | | |
| >CellResourceReportItem | | 1 . . . <maxCellingNBDU (=512)> | | |

TABLE 5-continued

| | | | | |
|---|---|---|---|---|
| >>Cell Global ID | M | | Refer to Cell Global ID definition in NGAP/XnAP/NR RRC | |
| >>PerSSBResourceReport List | | | | |
| >>>PerSSBResourceReport Item | | 1 . . . <maxSSBperCell (=64)> | | |
| >>>>SSB index | M | | SSB index Refer to SSB index definition in RRC (NR) | SSB index |
| >>>>UeResourceReport List | | 1 | | |
| >>>>>UeResourceReport Item | | 1 . . . <maxUeReport (=i.e., 2000)> | | |
| >>>>>> UE ID | M | | OCTET STRING | UE ID * i.e., GUTI (global unique temporary identifier) etc., which is an identifier that can distinguish individual terminals per cell in RAN |
| >>>>>> UE Alias ID | O | | OCTET STRING | Atemporary unique delimiter (C-RNTI, etc.) in local cell units is additionally defined |
| >>>>>>MonitoredBearer List | | 0 . . . 1 | | |
| >>>>>>>MonitoredBearer Item | | 1 . . . <maxnoofDRBs (=64)> | | |
| >>>>>>>>DRB ID | M | 0~63 | DRB ID defined in F1AP | Data Radio Bearer ID |
| >>>>>>>>5QI | O | 0~255 | 5QI ID defined in NGAP, XnAP, F1AP | 5QI (0~255) |
| >>>>>>>>QCI | O | 0~255 | QCI defined in S1AP, X2AP, F1AP | QCI (0~255) |
| >>>>>>>>S-NSSAI | O | | S-NSSAI defined in NGAP or XnAP | S-NSSI (SST, SD) |
| >>>>>>>>Monitored OccupiedBufferDurationDL | O | | INTEGER(0 . . . 10,000,000, . . . ) | Occupied buffer duration to calculate IP throughput (usec) |
| >>>>>>>>MonitoredData DL | O | | INTEGER(0 . . . 10,000,000,000, . . . ) | aggregated Data during non-empty buffer duration to calculate IP throughput (kBytes) |
| >>>>>>>>Monitored OccupiedBufferDurationUL | O | | INTEGER(0 . . . 10,000,000,000, . . . ) | Occupied buffer duration to calculate IP throughput (usec) |
| >>>>>>>>MonitoredData UL | O | | INTEGER(0 . . . 10,000,000,000, . . . ) | aggregated Data during non-empty buffer duration to calculate IP throughput (KBytes) |
| >>>>>>>>Monitored LatencyDL | O | | INTEGER(0 . . . 10,000,000,000, . . . ) | average latency (usec) |
| >>>>>>>>Monitored LatencyUL | O | | INTEGER(0 . . . 10,000,000,000, . . . ) | average latency (usec) |
| >>>>>>>>PRBUsageDL | O | | INTEGER(0 . . . 1,000,000,000, . . . ) | Used number of PRBs in average of DL for the monitored DRB of the UE during reported E2 period |

TABLE 5-continued

| | | | | |
|---|---|---|---|---|
| >>>>>>>>PRBUsageUL | O | | INTEGER(0 . . . 1,000,000,000, . . . ) | Used number of PRBs in average of UL for the monitored DRB of the UE during reported E2 period |
| >>>>>>MonitoredLcgList | | 0 . . . 1 | | |
| >>>>>>>MonitoredLcg Item | | 1 . . . <maxnoofLcgs (=8)> | | |
| >>>>>>>>LCG ID | M | 0~7 | Logical Channel Group ID defined in MAC | Logical Channel Group ID |
| >>>>>>>>Monitored OccupiedBufferDuration DL | O | | INTEGER(0 . . . 10,000,000, . . . ) | Occupied buffer duration to calculate IP throughput (usec) |
| >>>>>>>>MonitoredData DL | O | | INTEGER(0 . . . 10,000,000,000, . . . ) | aggregated Data during non-empty buffer duration to calculate IP throughput (kBytes) |
| >>>>>>>>Monitored OccupiedBufferDurationUL | O | | INTEGER(0 . . . 10,000,000,000, . . . ) | Occupied buffer duration to calculate IP throughput (usec) |
| >>>>>>>>MonitoredData UL | O | | INTEGER(0 . . . 10,000,000,000, . . . ) | aggregated Data during non-empty buffer duration to calculate IP throughput (KBytes) |
| >>>>>>>>Monitored LatencyDL | O | | INTEGER(0 . . . 10,000,000,000, . . . ) | average latency (usec) |
| >>>>>>>>Monitored LatencyUL | O | | INTEGER(0 . . . 10,000,000,000, . . . ) | average latency (usec) |
| >>>>>>>>PRBUsageDL | O | | INTEGER(0 . . . 1,000,000,000, . . . ) | Used number of PRBs in average of DL for the monitored DRB of the UE during reported E2 period |
| >>>>>>>>PRBUsageUL | O | | INTEGER(0 . . . 1,000,000,000, . . . ) | Used number of PRBs in average of UL for the monitored DRB of the UE during reported E2 period |

According to an embodiment, the delay parameter (MonitoredLatencyDL or MonitoredLatencyUL) may use a packet delay defined in the 3GPP TS 38.314 standard. For example, a downlink-related delay parameter (MonitoredLatencyDL) may include at least one of a downlink (DL) delay of an over-the-air interface, a delay in a radio link control (RLC) sublayer in gNB-DU, a delay in F1-U, and a delay in CU-UP. The downlink-related delay may be measured per DRB per UE. For example, the delay parameter (MonitoredLatencyUL) related to uplink may include at least one of an uplink (UL) packet data convergence protocol (PDCP) packet average delay, a UL delay of the over-the-air interface, a RLC packet delay, a delay in F1-U, and a PDCP re-ordering delay. The uplink-related delay may be measured per DRB per UE. Descriptions of these delay parameters are equally applicable to Tables 6 to 12 to be described later.

In Table 5, the format of SSB units may be omitted as described in FIG. 9B. In this case, the performance measurement container of the RIC indication message may be configured as shown in Table 6 below.

TABLE 6

| IE/Group Name | Presence | Range | IE type and reference | Semantics description |
|---|---|---|---|---|
| CellResourceReportList | | 1 | | |
| >CellResourceReportItem | | 1 . . . <maxCellingNBDU (=512)> | | |

TABLE 6-continued

| IE/Group Name | Presence | Range | IE type and reference | Semantics description |
|---|---|---|---|---|
| >>Cell Global ID | M | | Refer to Cell Global ID definition in NGAP/XnAP/ NR RRC | |
| >>UeResourceReportList | | 1 | | |
| >>>UeResourceReportItem | | 1 . . . <maxUeReport (=i.e., 2000)> | | |
| >>>>UE ID | M | | OCTET STRING | UE ID * i .e., GUTI (global unique temporary identifier) etc., which is an identifier that can distinguish individual terminals per cell in RAN |
| >>>>UE Alias ID | O | | OCTET STRING | A temporary unique delimiter (C-RNTI, etc.) in local cell units is additionally defined |
| >>>>MonitoredBearerList | | 0 . . . 1 | | |
| >>>>>MonitoredBearerItem | | 1 . . . <maxnoofDRBs (=64)> | | |
| >>>>>>DRB ID | M | 0~63 | DRB ID defined in F1AP | Data Radio Bearer ID |
| >>>>>>5QI | O | 0~255 | 5QI ID defined in NGAP, XnAP, F1AP | 5QI (0~255) |
| >>>>>>QCI | O | 0~255 | QCI defined in S1AP, X2AP, FlAP | QCI (0~255) |
| >>>>>>S-NSSAI | O | | S-NSSAI defined in NGAP or XnAP | S-NSSI (SST, SD) |
| >>>>>>Monitored OccupiedBufferDurationDL | O | | INTEGER(0 . . . 10,000,000, . . . ) | Occupied buffer duration to calculate IP throughput (usec) |
| >>>>>>MonitoredDataDL | O | | INTEGER(0 . . . 10,000,000,000, . . . ) | aggregated Data during non-empty buffer duration to calculate IP throughput (kBytes) |
| >>>>>>MonitoredOccupied BufferDurationUL | O | | INTEGER(0 . . . 10,000,000,000, . . . ) | Occupied buffer duration to calculate IP throughput (usec) |
| >>>>>>MonitoredDataUL | O | | INTEGER(0 . . . 10,000,000,000, . . . ) | aggregated Data during non-empty buffer duration to calculate IP throughput (KBytes) |
| >>>>>>MonitoredLatencyDL | O | | INTEGER(0 . . . 10,000,000,000, . . . ) | average latency (usec) |
| >>>>>>MonitoredLatencyUL | O | | INTEGER(0 . . . 10,000,000,000, . . . ) | average latency (usec) |
| >>>>>>PRBUsageDL | O | | INTEGER(0 . . . 1,000,000,000, . . . ) | Used number of PRBs in average of DL for the monitored DRB of the UE during reported E2 period |

TABLE 6-continued

| IE/Group Name | Presence | Range | IE type and reference | Semantics description |
|---|---|---|---|---|
| >>>>>>PRBUsageUL | O | | INTEGER(0 . . . 1,000,000,000, . . . ) | Used number of PRBs in average of UL for the monitored DRB of the UE during reported E2 period |
| >>>>MonitoredLcgList | | 0 . . . 1 | | |
| >>>>>MonitoredLcgItem | | 1 . . . <maxnoofLcgs (=8)> | | |
| >>>>>>LCG ID | M | 0~7 | Logical Channel Group ID defined in MAC | Logical Channel Group ID |
| >>>>>>Monitored OccupiedBufferDurationDL | O | | INTEGER(0 . . . 10,000,000, . . . ) | Occupied buffer duration to calculate IP throughput (usec) |
| >>>>>>MonitoredDataDL | O | | INTEGER(0 . . . 10,000,000,000, . . . ) | aggregated Data during non-empty buffer duration to calculate IP throughput (kBytes) |
| >>>>>>MonitoredOccupied BufferDurationUL | O | | INTEGER(0 . . . 10,000,000,000, . . . ) | Occupied buffer duration to calculate IP throughput (usec) |
| >>>>>>MonitoredDataUL | O | | INTEGER(0 . . . 10,000,000,000, . . . ) | aggregated Data during non-empty buffer duration to calculate IP throughput (KBytes) |
| >>>>>>MonitoredLatencyDL | O | | INTEGER(0 . . . 10,000,000,000, . . . ) | average latency (usec) |
| >>>>>>MonitoredLatencyUL | O | | INTEGER(0 . . . 10,000,000,000, . . . ) | average latency (usec) |
| >>>>>>PRBUsageDL | O | | INTEGER(0 . . . 1,000,000,000, . . . ) | Used number of PRBs in average of DL for the monitored DRB of the UE during reported E2 period |
| >>>>>>PRBUsageUL | O | | INTEGER(0 . . . 1,000,000,000, . . . ) | Used number of PRBs in average of UL for the monitored DRB of the UE during reported E2 period |

The above-described embodiments are related to measurement reporting performed in units of DRBs and logical channel groups (LCGs) in the corresponding UE. According to an embodiment, the RIC indication message may include a report configured only in DRB units. Table 7 exemplifies performance measurement container information according to the measurement in SSB units. Table 8 exemplifies the performance measurement container information according to UE units without the measurement in SSB units.

A Case of Performing Single Reporting in DRB List Unit

TABLE 7

| IE/Group Name | Presence | Range | IE type and reference | Semantics description |
|---|---|---|---|---|
| CellResourceReportList | | 1 | | |
| >CellResourceReportItem | | 1 . . . <maxCellingNBDU (=512)> | | |
| >>Cell Global ID | M | | Refer to Cell Global ID definition in NGAP/XnAP/ NR RRC | |
| >>PerSSBResourceReport List | | | | |
| >>>PerSSBResourceReport Item | | 1 . . . <maxSSBperCell (=64)> | | |
| >>>>SSB index | M | | SSB index Refer to SSB index definition in RRC (NR) | SSB index |
| >>>>UeResourceReportList | | 1 | | |
| >>>>>UeResourceReportItem | | 1 . . . <maxUeReport (=i.e., 2000)> | | |
| >>>>>> UE ID | M | | OCTET STRING | UE ID * i .e ., GUTI etc., which is an identifier that can distinguish individual terminals per cell in RAN |
| >>>>>> UE Alias ID | O | | OCTET STRING | A temporary unique delimiter (C-RNTI, etc.) in local cell units is additionally defined |
| >>>>>>MonitoredBearerList | | 0 . . . 1 | | |
| >>>>>>>MonitoredBearer Item | | 1 . . . <maxnoofDRBs (=64)> | | |
| >>>>>>>>DRB ID | M | 0~63 | DRB ID defined in F1AP | Data Radio Bearer ID |
| >>>>>>>>5QI | O | 0~255 | 5QI ID defined in NGAP, XnAP, F1AP | 5QI (0~255) |
| >>>>>>>>QCI | O | 0~255 | QCI defined in S1AP, X2AP, FIAP | QCI (0~255) |
| >>>>>>>>S-NSSAI | O | | S-NSSAI defined in NGAP or XnAP | S-NSSI (SST, SD) |
| >>>>>>>>Monitored OccupiedBufferDurationDL | O | | INTEGER(0 . . . 10,000,000, . . . ) | Occupied buffer duration to calculate IP throughput (usec) |
| >>>>>>>>MonitoredDataDL | O | | INTEGER(0 . . . 10,000,000,000, . . . ) | aggregated Data during non-empty buffer duration to calculate IP throughput (kBytes) |
| >>>>>>>>Monitored OccupiedBufferDurationUL | O | | INTEGER(0 . . . 10,000,000,000, . . . ) | Occupied buffer duration to calculate IP throughput (usec) |

TABLE 7-continued

| IE/Group Name | Presence | Range | IE type and reference | Semantics description |
|---|---|---|---|---|
| >>>>>>>>MonitoredDataUL | O | | INTEGER(0 . . . 10,000,000,000, . . . ) | aggregated Data during non-empty buffer duration to calculate IP throughput (KBytes) |
| >>>>>>>>MonitoredLatency DL | O | | INTEGER(0 . . . 10,000,000,000, . . . ) | average latency (usec) |
| >>>>>>>>MonitoredLatency UL | O | | INTEGER(0 . . . 10,000,000,000, . . . ) | average latency (usec) |
| >>>>>>>>PRBUsageDL | O | | INTEGER(0 . . . 1,000,000,000, . . . ) | Used number of PRBs in average of DL for the monitored DRB of the UE during reported E2 period |
| >>>>>>>>PRBUsageUL | O | | INTEGER(0 . . . 1,000,000,000, . . . ) | Used number of PRBs in average of UL for the monitored DRB of the UE during reported E2 period |

TABLE 8

| IE/Group Name | Presence | Range | IE type and reference | Semantics description |
|---|---|---|---|---|
| CellResourceReportList | | 1 | | |
| >CellResourceReportItem | | 1 . . . <maxCellingNBDU (=512)> | | |
| >>Cell Global ID | M | | Refer to Cell Global ID definition in NGAP/XnAP/ NR RRC | |
| >>UeResourceReportList | | 1 | | |
| >>>UeResourceReportItem | | 1 . . . <maxUeReport (=i.e., 2000)> | | |
| >>>> UE ID | M | | OCTET STRING | UE ID * i.e., GUTI etc., which is an identifier that can distinguish individual terminals per cell in RAN |
| >>>> UE Alias ID | O | | OCTET STRING | A temporary unique delimiter (C-RNTI, etc.) in local cell units is additionally defined |
| >>>>MonitoredBearerList | | 0 . . . 1 | | |
| >>>>>MonitoredBearerItem | | 1 . . . <maxnoofDRBs (=64)> | | |
| >>>>>>DRB ID | M | 0~63 | DRB ID defined in F1AP | Data Radio Bearer ID |
| >>>>>>5QI | O | 0~255 | 5QI ID defined in NGAP, XnAP, F1AP | 5QI (0~255) |
| >>>>>>QCI | O | 0~255 | QCI defined in S1AP, X2AP, F1AP | QCI (0~255) |
| >>>>>>S-NSSAI | O | | S-NSSAI defined in NGAP or XnAP | S-NSSI (SST, SD) |

TABLE 8-continued

| IE/Group Name | Presence | Range | IE type and reference | Semantics description |
|---|---|---|---|---|
| >>>>>>MonitoredOccupiedBufferDurationDL | O | | INTEGER(0 . . . 10,000,000, . . . ) | Occupied buffer duration to calculate IP throughput (usec) |
| >>>>>>MonitoredDataDL | O | | INTEGER(0 . . . 10,000,000,000, . . . ) | aggregated Data during non-empty buffer duration to calculate IP throughput (kBytes) |
| >>>>>>MonitoredOccupiedBufferDurationUL | O | | INTEGER(0 . . . 10,000,000,000, . . . ) | Occupied buffer duration to calculate IP throughput (usec) |
| >>>>>>MonitoredDataUL | O | | INTEGER(0 . . . 10,000,000,000, . . . ) | aggregated Data during non-empty buffer duration to calculate IP throughput (KBytes) |
| >>>>>>MonitoredLatencyDL | O | | INTEGER(0 . . . 10,000,000,000, . . . ) | average latency (usec) |
| >>>>>>MonitoredLatencyUL | O | | INTEGER(0 . . . 10,000,000,000, . . . ) | average latency (usec) |
| >>>>>>PRBUsageDL | O | | INTEGER(0 . . . 1,000,000,000, . . . ) | Used number of PRBs in average of DL for the monitored DRB of the UE during reported E2 period |
| >>>>>>PRBUsageUL | O | | INTEGER(0 . . . 1,000,000,000, . . . ) | Used number of PRBs in average of UL for the monitored DRB of the UE during reported E2 period |

The above-described embodiments are related to measurement reporting performed in DRB units in the corresponding UE. According to an embodiment, the RIC indication message may include a report configured only in LCG units. Table 9 exemplifies performance measurement container information according to the measurement in SSB units. Table 10 exemplifies the performance measurement container information according to UE units without the measurement in SSB units.

An embodiment of a single report in LCG units is added.

TABLE 9

| IE/Group Name | Presence | Range | IE type and reference | Semantics description |
|---|---|---|---|---|
| CellResourceReportList | | 1 | | |
| >CellResourceReportItem | | 1 . . . <maxCellingNBDU (=512)> | | |
| >>Cell Global ID | M | | Refer to Cell Global ID definition in NGAP/XnAP/NR RRC | |
| >>PerSSBResourceReportList | | 1 | | |
| >>>PerSSBResourceReportItem | | 1 . . . <maxSSBperCell (=64)> | | |
| >>>>SSB index | M | | SSB index Refer to SSB index definition in RRC (NR) | SSB index |
| >>>>UeResourceReportList | | 1 | | |
| >>>>>UeResourceReportItem | | 1 . . . <maxUeReport (=i.e., 2000)> | | |

TABLE 9-continued

| IE/Group Name | Presence | Range | IE type and reference | Semantics description |
|---|---|---|---|---|
| >>>>>> UE ID | M | | OCTET STRING | UE ID, i.e., GUTI etc., which is an identifier that can globally distinguish a terminal |
| >>>>>> UE Alias ID | O | | OCTET STRING | A temporary unique delimiter (C-RNTI, etc.) in local cell units is additionally defined |
| >>>>>>MonitoredLcgList | | 0 . . . 1 | | |
| >>>>>>>MonitoredLcgItem | | 1 . . . <maxnoofLcgs (=8)> | | |
| >>>>>>>>LCG ID | M | 0~7 | Logical Channel Group ID defined in MAC | Logical Channel Group ID |
| >>>>>>>>Monitored OccupiedBufferDurationDL | O | | INTEGER(0 . . . 10,000,000, . . . ) | Occupied buffer duration to calculate IP throughput (usec) |
| >>>>>>>>Monitored DataDL | O | | INTEGER(0 . . . 10,000,000,000, . . . ) | aggregated Data during non-empty buffer duration to calculate IP throughput (kBytes) |
| >>>>>>>>Monitored OccupiedBufferDurationUL | O | | INTEGER(0 . . . 10,000,000,000, . . . ) | Occupied buffer duration to calculate IP throughput (usec) |
| >>>>>>>>MonitoredDataUL | O | | INTEGER(0 . . . 10,000,000,000, . . . ) | aggregated Data during non-empty buffer duration to calculate IP throughput (KBytes) |
| >>>>>>>>MonitoredLatency DL | O | | INTEGER(0 . . . 10,000,000,000, . . . ) | average latency (usec) |
| >>>>>>>>MonitoredLatency UL | O | | INTEGER(0 . . . 10,000,000,000, . . . ) | average latency (usec) |
| >>>>>>>>PRBUsageDL | O | | INTEGER(0 . . . 1,000,000,000, . . . ) | Used number of PRBs in average of DL for the monitored DRB of the UE during reported E2 period |
| >>>>>>>>PRBUsageUL | O | | INTEGER(0 . . . 1,000,000,000, . . . ) | Used number of PRBs in average of UL for the monitored DRB of the UE during reported E2 period |

TABLE 10

| IE/Group Name | Presence | Range | IE type and reference | Semantics description |
|---|---|---|---|---|
| CellResourceReportList | | 1 | | |
| >CellResourceReportItem | | 1 . . . <maxCellingNBDU (=512)> | | |

TABLE 10-continued

| IE/Group Name | Presence | Range | IE type and reference | Semantics description |
|---|---|---|---|---|
| >>Cell Global ID | M | | Refer to Cell Global ID definition in NGAP/XnAP/ NR RRC | |
| >>UeResourceReportList | | 1 | | |
| >>>UeResourceReportItem | | 1 . . . <maxUeReport (=i.e., 2000)> | | |
| >>>> UE ID | M | | OCTET STRING | UE ID, i.e., GUTI etc., which is an identifier that can globally distinguish a terminal |
| >>>> UE Alias ID | O | | OCTET STRING | A temporary unique delimiter (C-RNTI, etc.) in local cell units is additionally defined |
| >>>>MonitoredLcgList | | 0 . . . 1 | | |
| >>>>>MonitoredLcgItem | | 1 . . . <maxnoofLcgs (=8)> | | |
| >>>>>>LCG ID | M | 0~7 | Logical Channel Group ID defined in MAC | Logical Channel Group ID |
| >>>>>>Monitored OccupiedBufferDurationDL | O | | INTEGER(0 . . . 10,000,000, . . . ) | Occupied buffer duration to calculate IP throughput (usec) |
| >>>>>>MonitoredDataDL | O | | INTEGER(0 . . . 10,000,000,000, . . . ) | aggregated Data during non-empty buffer duration to calculate IP throughput (kBytes) |
| >>>>>>Monitored OccupiedBufferDurationUL | O | | INTEGER(0 . . . 10,000,000,000, . . . ) | Occupied buffer duration to calculate IP throughput (usec) |
| >>>>>>MonitoredDataUL | O | | INTEGER(0 . . . 10,000,000,000, . . . ) | aggregated Data during non-empty buffer duration to calculate IP throughput (KBytes) |
| >>>>>>MonitoredLatencyDL | O | | INTEGER(0 . . . 10,000,000,000, . . . ) | average latency (usec) |
| >>>>>>MonitoredLatencyUL | O | | INTEGER(0 . . . 10,000,000,000, . . . ) | average latency (usec) |
| >>>>>>PRBUsageDL | O | | INTEGER(0 . . . 1,000,000,000, . . . ) | Used number of PRBs in average of DL for the monitored DRB of the UE during reported E2 period |
| >>>>>>PRBUsageUL | O | | INTEGER(0 . . . 1,000,000,000, . . . ) | Used number of PRBs in average of UL for the monitored DRB of the UE during reported E2 period |

Referring to Tables 5 to 10, reporting in DRB units and reporting in LCG units are independently configured in the UE. According to the value of the list (0 or 1), reporting in DRB units and reporting in LCG units are independently configured. Alternatively, the reporting in DRB units and the reporting in LCG units may be configured together. The RIC indication message may include a report configured in DRB and LCG units. Table 11 exemplifies performance measurement container information according to the measurement in SSB units. Table 12 exemplifies the performance measurement container information according to UE units without the measurement in SSB units.

TABLE 11

| IE/Group Name | Presence | Range | IE type and reference | Semantics description |
|---|---|---|---|---|
| CellResourceReportList | | 1 | | |
| >CellResourceReportItem | | 1 . . . <maxCellingNBDU (=512)> | | |
| >>Cell Global ID | M | | Refer to Cell Global ID definition in NGAP/XnAP/ NR RRC | |
| >>PerSSBResourceReportList | | | | |
| >>>PerSSBResourceReport Item | | 1 . . . <maxSSBperCell (=64)> | | |
| >>>>SSB index | M | | SSB index Refer to SSB index definition in RRC (NR) | SSB index |
| >>>>UeResourceReportList | | 1 | | |
| >>>>>UeResourceReportItem | | 1 . . . <maxUeReport (=i.e., 2000)> | | |
| >>>>>> UE ID | M | | OCTET STRING | UE ID * i.e., GUTI (global unique temporary identifier) etc., identifier that can distinguish individual terminals per cell in RAN |
| >>>>>> UE Alias ID | O | | OCTET STRING | A temporary unique delimiter (C-RNTI, etc.) in local cell units is additionally defined |
| >>>>>>MonitoredBearerand LcgList | | 0 . . . 1 | | |
| >>>>>>>MonitoredBearerItem | | 1 . . . <maxnoofDRBs (=64)> | | |
| >>>>>>>>DRB ID | M | 0~63 | DRB ID defined in F1AP | Data Radio Bearer ID |
| >>>>>>>>5QI | O | 0~255 | 5QI ID defined in NGAP, XnAP ,F1AP | 5QI (0~255) |
| >>>>>>>>QCI | O | 0~255 | QCI defined in S1AP, X2AP, F1AP | QCI (0~255) |
| >>>>>>>>S-NSSAI | O | | S-NSSAI defined in NGAP or XnAP | S-NSSI (SST, SD) |
| >>>>>>>>Monitored OccupiedBufferDurationDL | O | | INTEGER(0 . . . (0..10,000,000, . . . ) | Occupied buffer duration to calculate IP throughput (usec) |
| >>>>>>>>MonitoredDataDL | O | | INTEGER(0 . . . 10,000,000,000, . . . ) | aggregated Data during non-empty buffer duration to calculate IP throughput (kBytes) |
| >>>>>>>>MonitoredOccupied BufferDurationUL | O | | INTEGER(0 . . . 10,000,000,000, . . . ) | Occupied buffer duration to calculate IP throughput (usec) |
| >>>>>>>>MonitoredDataUL | O | | INTEGER(0 . . . 10,000,000,000, . . . ) | aggregated Data during non-empty buffer duration to calculate IP throughput (KBytes) |

TABLE 11-continued

| IE/Group Name | Presence | Range | IE type and reference | Semantics description |
|---|---|---|---|---|
| >>>>>>>>MonitoredLatency DL | O | | INTEGER(0 . . . 10,000,000,000, . . . ) | average latency (usec) |
| >>>>>>>>MonitoredLatency UL | O | | INTEGER(0 . . . 10,000,000,000, . . . ) | average latency (usec) |
| >>>>>>>>PRBUsageDL | O | | INTEGER(0 . . . 1,000,000,000, . . . ) | Used number of PRBs in average of DL for the monitored DRB of the UE during reported E2 period |
| >>>>>>>>PRBUsageUL | O | | INTEGER(0 . . . 1,000,000,000, . . . ) | Used number of PRBs in average of UL for the monitored DRB of the UE during reported E2 period |
| >>>>>>>MonitoredLcgItem | | 1 . . . <maxnoofLcgs (=8)> | | |
| >>>>>>>>LCG ID | M | 0~7 | Logical Channel Group ID defined in MAC | Logical Channel Group ID |
| >>>>>>>>Monitored OccupiedBufferDurationDL | O | | INTEGER(0 . . . 10,000,000, . . . ) | Occupied buffer duration to calculate IP throughput (usec) |
| >>>>>>>>MonitoredDataDL | O | | INTEGER(0 . . . 10,000,000,000, . . . ) | aggregated Data during non-empty buffer duration to calculate IP throughput (kBytes) |
| >>>>>>>>MonitoredOccupied BufferDurationUL | O | | INTEGER(0 . . . 10,000,000,000, . . . ) | Occupied buffer duration to calculate IP throughput (usec) |
| >>>>>>>>MonitoredDataUL | O | | INTEGER(0 . . . 10,000,000,000, . . . ) | aggregated Data during non-empty buffer duration to calculate IP throughput (KBytes) |
| >>>>>>>>MonitoredLatency DL | O | | INTEGER(0 . . . 10,000,000,000, . . . ) | average latency (usec) |
| >>>>>>>>MonitoredLatency UL | O | | INTEGER(0 . . . 10,000,000,000, . . . ) | average latency (usec) |
| >>>>>>>>PRBUsageDL | O | | INTEGER(0 . . . 1,000,000,000, . . . ) | Used number of PRBs in average of DL for the monitored DRB of the UE during reported E2 period |
| >>>>>>>>PRBUsageUL | O | | INTEGER(0 . . . 1,000,000,000, . . . ) | Used number of PRBs in average of UL for the monitored DRB of the UE during reported E2 period |

TABLE 12

| IE/Group Name | Presence | Range | IE type and reference | Semantics description |
|---|---|---|---|---|
| CellResourceReport List | | 1 | | |
| >CellResourceReport Item | | 1 . . . <maxCelling NBDU (=512)> | | |
| >>Cell Global ID | M | | Refer to Cell Global ID definition in NGAP/XnAP/NR RRC | |

TABLE 12-continued

| IE/Group Name | Presence | Range | IE type and reference | Semantics description |
|---|---|---|---|---|
| >>UeResourceReport List | | 1 | | |
| >>>UeResource ReportItem | | 1 . . . <maxUe Report (=i.e., 2000)> | | |
| >>>> UE ID | M | | OCTET STRING | UE ID * i.e., GUTI (global unique temporary identifier) etc., identifier that can distinguish individual terminals per cell in RAN |
| >>>> UE Alias ID | O | | OCTET STRING | A temporary unique delimiter (C-RNTI, etc.) in local cell units is additionally defined |
| >>>>Monitored BearerandLcgList | | 0 . . . 1 | | |
| >>>>>Monitored BearerItem | | 1 . . . <maxno ofDRBs (=64)> | | |
| >>>>>>DRB ID | M | 0~63 | DRB ID defined in F1AP | Data Radio Bearer ID |
| >>>>>>5QI | O | 0~255 | 5QI ID defined in NGAP, XnAP, F1AP | 5QI (0~255) |
| >>>>>>QCI | O | 0~255 | QCI defined in S1AP, X2AP, F1AP | QCI (0~255) |
| >>>>>>S-NSSAI | O | | S-NSSAI defined in NGAP or XnAP | S-NSSI (SST, SD) |
| >>>>>>Monitored OccupiedBuffer DurationDL | O | | INTEGER (0 . . . 10,000,000, . . . ) | Occupied buffer duration to calculate IP throughput (usec) |
| >>>>>>Monitored DataDL | O | | INTEGER (0 . . . 10,000,000,000, . . . ) | aggregated Data during non-empty buffer duration to calculate IP throughput (kBytes) |
| >>>>>> MonitoredOccupied BufferDurationUL | O | | INTEGER (0 . . . 10,000,000,000, . . . ) | Occupied buffer duration to calculate IP throughput (usec) |
| >>>>>>Monitored DataUL | O | | INTEGER (0 . . . 10,000,000,000, . . . ) | aggregated Data during non-empty buffer duration to calculate IP throughput (KBytes) |
| >>>>>>Monitored LatencyDL | O | | INTEGER (0 . . . 10,000,000,000, . . . ) | average latency (usec) |
| >>>>>>Monitored LatencyUL | O | | INTEGER (0 . . . 10,000,000,000, . . . ) | average latency (usec) |
| >>>>>>PRBUsage DL | O | | INTEGER(0 . . . 1,000,000,000, . . . ) | Used number of PRBs in average of DL for the monitored DRB of the UE during reported E2 period |
| >>>>>>PRBUsage UL | O | | INTEGER(0 . . . 1,000,000,000, . . . ) | Used number of PRBs in average of UL for the monitored DRB of the UE during reported E2 period |
| >>>>>Monitored LcgItem | | 1 . . . <maxnoof Lcgs(=8)> | | |

TABLE 12-continued

| IE/Group Name | Presence | Range | IE type and reference | Semantics description |
|---|---|---|---|---|
| >>>>>>LCG ID | M | 0~7 | LogicalChannel Group ID defined in MAC | Logical Channel Group ID |
| >>>>>>Monitored OccupiedBuffer DurationDL | O | | INTEGER (0 . . . 10,000,000, . . . ) | Occupied buffer duration to calculate IP throughput (usec) |
| >>>>>>Monitored DataDL | O | | INTEGER (0 . . . 10,000,000,000, . . . ) | aggregated Data during non-empty buffer duration to calculate IP throughput (kBytes) |
| >>>>>> MonitoredOccupied BufferDurationUL | O | | INTEGER (0 . . . 10,000,000,000, . . . ) | Occupied buffer duration to calculate IP throughput (usec) |
| >>>>>>Monitored DataUL | O | | INTEGER (0 . . . 10,000,000,000, . . . ) | aggregated Data during non-empty buffer duration to calculate IP throughput (KBytes) |
| >>>>>>Monitored LatencyDL | O | | INTEGER (0 . . . 10,000,000,000, . . . ) | average latency (usec) |
| >>>>>>Monitored LatencyUL | O | | INTEGER (0 . . . 10,000,000,000, . . . ) | average latency (usec) |
| >>>>>>PRBUsage DL | O | | INTEGER (0 . . . 1,000,000,000, . . . ) | Used number of PRBs in average of DL for the monitored DRB of the UE during reported E2 period |
| >>>>>>PRBUsage UL | O | | INTEGER(0.. 1,000,000,000, ...) | Used number of PRBs in average of UL for the monitored DRB of the UE during reported E2 period |

Although the IE for measuring the performance of the O-DU has been described in FIGS. 9A and 9B, the performance measurement of a newly introduced method may also be performed in the O-CU-CP according to an embodiment. As an example, a massive Internet of everything (mIOT) device may transmit traffic to a non-access stratum (NAS), and the O-CU-CP may support performance measurement thereof.

In the disclosure, examples in which a UE ID is included in each message format for performance measurement for each UE ID have been described. The UE ID described in this disclosure may imply a UE ID usable on the E2 interface. According to an embodiment, the structure of the UE ID may be configured as shown in the table below.

TABLE 13

| IE/Group Name | Presence | Range | IE type and reference | Semantics description |
|---|---|---|---|---|
| CHOICE UEID case | M | | | |
| >gNB | | | | To be used by E2 Node of type gNB when connected to 5GC |
| >>AMF UE NGAP ID | M | | 6.2.3.16 | |
| >>GUAMI | M | | 6.2.3.17 | |
| >>gNB-CU UE F1AP ID List | C-ifCUDU separated | | | Conditionally present for a CU-DU separated gNB. More than 1 F1AP ID shall be reported only when NR-DC is established. |

TABLE 13-continued

| IE/Group Name | Presence | Range | IE type and reference | Semantics description |
|---|---|---|---|---|
| >>gNB-CU UE F1AP ID Item | | 1 . . . <max F1APId> | | |
| >>>gNB-CU UE FIAP ID | M | | 6.2.3.21 | |
| >>gNB-CU-CP UE E1AP ID List | C-ifCPUP separated | | | Conditionally present for a CP-UP separated gNB. |
| >>>gNB-CU-CP UE E1AP ID Item | | 1 . . . <max E1APId> | | |
| >>>>gNB-CU-CP UE E1AP ID | M | | 6.2.3.20 | |
| >>RAN UE ID | O | | 6.2.3.25 | |
| >>M-NG-RAN node UE Xn AP ID | C-ifDC Setup | | 6.2.3.19 | Conditionally present when DC is established. To be reported by both MN and SN |
| >>Global gNB ID | C-ifDC Setup | | 6.2.3.3 | Conditionally present when DC is established. To be reported only by SN |
| >gNB-DU/en-gNB-DU | | | | To be used by E2 node of type gNB-DU. Associated Global gNB ID implied by E2 node ID. |
| >>gNB-CU UE F1AP ID | M | | 6.2.3.21 | |
| >>RAN UE ID | O | | 6.2.3.25 | |
| >gNB-CU-UP/en-gNB-CU-UP | | | | To be used by E2 node of type gNB-CU-UP. Associated Global gNB ID implied by E2 node ID. |
| >>gNB-CU-CP UE E1AP ID | M | | 6.2.3.20 | |
| >>RAN UE ID | O | | 6.2.3.25 | |
| >ng-eNB | | | | To be used by E2 Node of type ng-eNB when connected to 5GC |
| >>AMF UE NGAP ID | M | | 6.2.3.16 | |
| >>GUAMI | M | | 6.2.3.17 | |
| >>ng-eNB-CU UE W1AP ID | C-ifCUDUsep-arated | | 6.2.3.22 | Conditionally present for a CU-DU separated ng-eNB. |
| >>M-NG-RAN node UE Xn AP ID | C-ifDC Setup | | 6.2.3.19 | Conditionally present when DC is established. To be reported by both MN and SN. |
| >>Global ng-eNB ID | C-ifDC Setup | | 6.2.3.8 | Conditionally present when DC is established. To be reported only by SN. |
| >ng-eNB-DU | | | | To be used by E2 node of type ng-eNB-DU. Associated Global ng-eNB ID implied by E2 node ID. |
| >> ng-eNB-CU UE W1AP ID | M | | 6.2.3.22 | |
| > en-gNB | | | | To be used by E2 Node of type en-gNB when connected to EPC and EN-DC is established |
| >>MeNB UE X2AP ID | M | | 6.2.3.23 | |
| >>MeNB UE X2AP ID Extension | O | | 6.2.3.24 | |
| >>Global eNB ID | M | | 6.2.3.9 | |
| >>gNB-CU UE F1AP ID | C-ifCUDUseperated | | 6.2.3.21 | Conditionally present for a CU-DU separated en-gNB. |
| >>gNB-CU-CP UE E1AP ID List | C-ifCPUPsep-arated | | | Conditionally present for a CP-UP separated en-gNB. |
| >>>gNB-CU UE E1AP ID Item | | 1 <max E1APId> | | |
| >>>>gNB-CU-CP UE E1AP ID | M | | 6.2.3.20 | |

TABLE 13-continued

| IE/Group Name | Presence | Range | IE type and reference | Semantics description |
|---|---|---|---|---|
| >> RAN UE ID | O | | 6.2.3.25 | |
| >eNB | | | | To be used by E2 Node of type eNB when connected to EPC. |
| >>MME UE SIAP ID | M | | 6.2.3.26 | |
| >>GUMMEI | M | | 6.2.3.18 | |
| >>MeNB UE X2AP ID | C-ifDC Setup | | 6.2.3.23 | Conditionally present when DC is established. To be reported by MeNB and SeNB. |
| >>MeNB UE X2AP ID Extension | C-ifDC Setup | | 6.2.3.24 | Conditionally present when DC is established. To be reported by MeNB and SeNB. |
| >>Global eNB ID | C-ifDC Setup | | 6.2.3.9 | Conditionally present when DC is established. To be reported only by SeNB. |

For a detailed description of each IE, the O-RAN.WG3.E2SM standard will be referred to.

Figure 10:
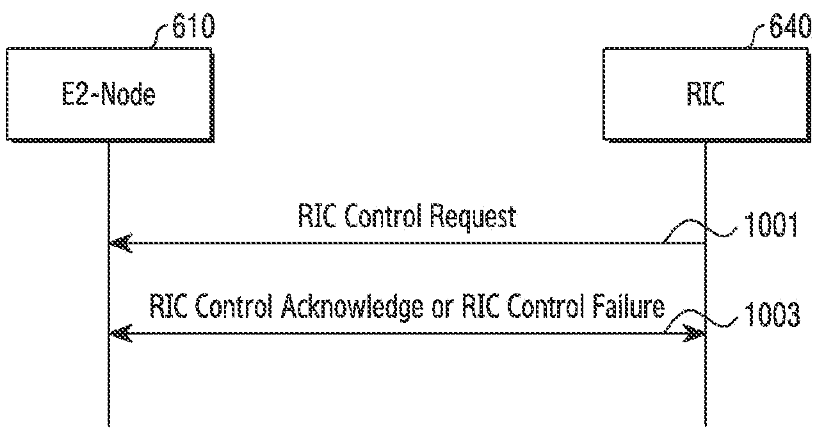
FIG. 10 illustrates an example of an RIC control procedure according to an embodiment of the disclosure.

FIG. 10 illustrates an example of an RIC control procedure according to an embodiment of the disclosure. The RIC control procedure may include transmission of an RIC control request and a response thereto. Depending on whether the RIC control request is accepted or not, the response may include RIC CONTROL ACKNOWLEDGE or RIC CONTROL FAILURE.

Referring to FIG. 10, in operation 1001, an RIC may transmit an RIC control request message to an E2 node. The RIC control request message is to initiate or resume a specific function of the E2 node.

In operation 1003, the E2 node may transmit a response to the RIC control request message to the RIC. According to an embodiment, the E2 node may accept a control request according to the RIC control request message. The E2 node having received the RIC control request message may determine a target function by using the information of an RAN Function ID IE. In addition, the E2 node may initiate the RIC control procedure requested by the information of the RIC control message. In response thereto, the E2 node may transmit an RIC control acknowledgment message to the RIC. In addition, according to an embodiment, the E2 node may not accept the control request according to the RIC control request message. For example, if the calling process ID requested by the RIC control request message does not exist in the E2 node or a timer has expired, the E2 node may fail to perform the request according to the RIC control procedure. In this case, the E2 node may transmit an RIC control failure message to the RIC as a response.

The RIC may perform resource control of the E2 node through the above-described procedures. According to an embodiment, the RIC may identify the state of the E2 node through the result of monitoring the KPI of the E2 node. The RIC may perform resource control per individual slice (i.e., network slice 0) in the E2 node according to the state of the E2 node. Accordingly, a control message including information for controlling a radio resource portion and a scheduling priority for resource control per slice is required. Since RIC CONTROL is not defined in depth in the current E2AP standard, the disclosure defines a RIC CONTROL message and proposes a related message.

RIC Control Message

To define the style of the RIC control message, a service style list may be defined. A specific type of RIC style type in the list may indicate radio resource control. For example, the RIC style type may be configured as shown in the table below.

TABLE 14

| RIC Style Type | Style Name | Style Description |
|---|---|---|
| 1 | ResourceControl message | Used to control the available radio resource in the E2 Node RAN Function |

The style may provide insertion of a cell resource control IE delivered in a transparent container together with an associated header providing a cell global ID, a PLMN ID, and a slice ID.

RIC control message priority may be used by the RAN function to align the queuing of incoming control messages and E2 node originated messages within the same cell global ID, PLMN ID, and slice ID. The following rules may be applied.

Higher-priority control messages are processed before lower-priority control messages.

Positive RIC control message priority implies a higher priority than an E2 node originated message.

Negative priority implies that the E2 node originated message should be transmitted before the incoming control message.

Basic control priority=0 implies that control messages are processed with the same priority as that of the E2 node originated messages.

According to an embodiment, the RIC control message may include a header configured as shown in the table below.

TABLE 15

| 8.2.1.6 RIC Control Header IE |
|---|
| This information element is part of the RIC CONTROL message sent by the Near-RT RIC to a E2 Node and is required for RIC Control Procedure. Direction: Near-RT RIC → E2 Node. |
| IE/Group Name<br>CHOICE Format<br>>E2SM-KPM Control Header Format 1 |
| 8.2.1.6.1 E2SM-KPM Control Header Format 1 |

| IE/Group Name | Presence | Range | IE type and reference | Semantics description |
|---|---|---|---|---|
| Cell Global ID | M | | 8.3.21 | |
| PLMN ID | M | | 8.3.22 | |
| Slice ID | M | | 8.3.23 | |
| RIC Control Message Priority | O | | 8.3.12 | |

According to an embodiment, the RIC control message may include the RIC control message IE configured as shown in the following table.

TABLE 16

| 8.2.1.7 RIC Control Message IE |
|---|
| This information element is part of the RIC CONTROL message sent by the Near-RT RIC to a E2 Node and is required for RIC Control Procedure. Direction: Near-RT RIC → E2 Node. |

| IE/Group Name | Presence | Range | IE type and reference | Semantics description |
|---|---|---|---|---|
| CHOICE Format >E2SM-KPM Control Message Format 1 | M | | 8.2.1.7.1 | |

| 8.2.1.7.1 E2SM-KPM Control Message Format 1 |
|---|
| Content is encoded as per definition of network interface type indicated in the Network Interface Type IE in associated RIC Control Header IE. |

| IE/Group Name | Presence | Range | IE type and reference | Semantics description |
|---|---|---|---|---|
| Resource Control Message | M | | 8.3.17 | |

| 8.3.17 Resource Control Message |
|---|
| This IE defines the Resource Control Container IE |

| IE/Group Name | Presence | Range | IE type and reference | Semantics description |
|---|---|---|---|---|
| Sequence of Resource Control Containers | | 1 . . . <maxof Containers> | | |
| Resource Control Container | O | | 8.3.18 | |
| >RAN Container | O | | 8.3.27 | |

The RIC control message IE may include a container in a manner similar to the RIC indication. According to an embodiment, the container included in the RIC control message may be related to resource control of the E2 node. Although the container is referred to as a resource control container, it may be replaced by a parameter name for performing the same function. A resource control container according to embodiments of the disclosure may include resource configuration configured per slice unit.

According to an embodiment, the resource control container included in the RIC control message may be configured as shown in the table below. The resource control container corresponds to the "Resource Control Container of paragraph 8.3.18" of Table 16 above. Each IE of the table may be configured in a slice-specific manner

TABLE 17

| | Presence | Range | IE type and reference | Semantics description |
|---|---|---|---|---|
| MaxsliceResource PortionDL | O | | INTEGER (0 . . . 100,) | Maximum dedicated resource reservation per slices for DL (%) |
| MinSliceResource PortionDL | O | | INTEGER (0 . . . 100,) | Minimum dedicated resource reservation per slices for DL (%) |
| SlicePriority Control DL | O | | INTEGER (0 . . . 100,) | Priority (scheduling weight) of the slice for DL i.e., PF weight can be multiplied by this value. 0 is reserved. |
| MaxSliceResource Portion UL | O | | INTEGER (0 . . . 100,) | Maximum dedicated resource reservation per slices for UL (%) |
| MinSliceResource Portion UL | O | | INTEGER (0 . . . 100,) | Minimum dedicated resource reservation per slices for UL (%) |
| SlicePriorityControl UL | O | | INTEGER (0 . . . 100,) | Priority (scheduling weight) of the slice for UL i.e., PF weight can be multiplied by this value. 0 is reserved. |

Figure 11A:
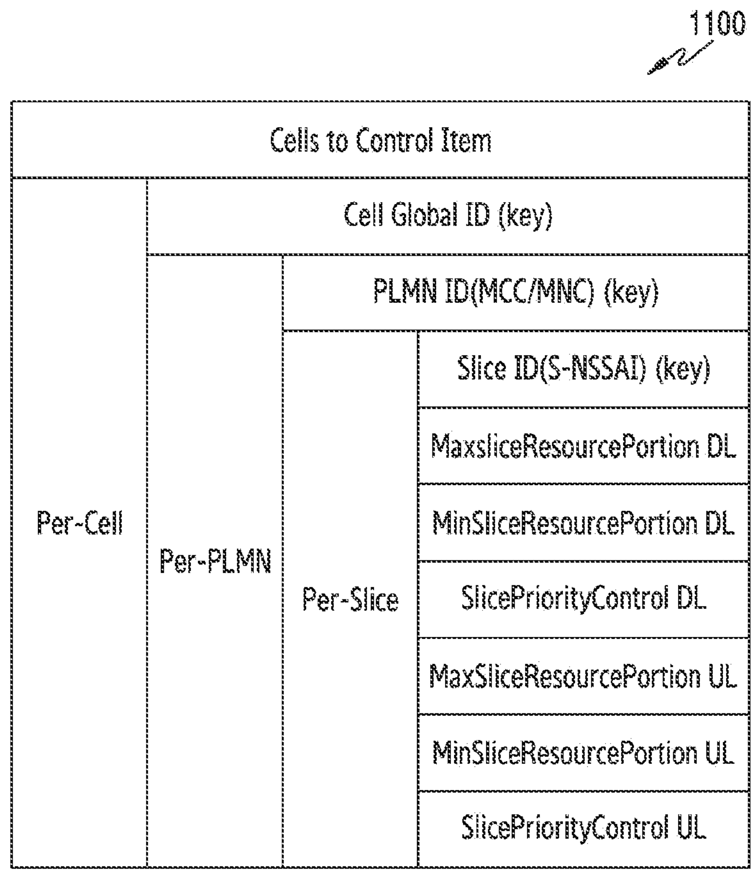

FIGS. 11A and 11B illustrate examples of RIC control messages according to various embodiments of the disclosure. In FIGS. 11A and 11B, examples of containers transmitted from the RIC to the O-DU are shown.

Referring to FIG. 11A, a message 1100 may include a cell ID. The cell ID may include a cell global ID. The message may include a list of PLMNs corresponding to the cell ID. The PLMN list may include one or more PLMNs. For example, the PLMN may include a mobile country code (MCC) and a mobile network code (MNC). Each PLMN may include one or more slices. In this case, information per slice may be configured with reference to Table 16 above. According to an embodiment, the slice-specific information listed in Table 16 may be included in the control message. According to another embodiment, at least one of the slice-specific information listed in Table 16 may be omitted from the control message.

Referring to FIG. 11B, a message 1150 may include a cell ID. The cell ID may include a cell global ID. The message may include a list of slices corresponding to the cell ID. The message may include one or more slices corresponding to the cell ID. That is, unlike the message 1100, the message 1150 may be configured to perform resource control per slice without control in the PLMN level unit. Information per slice may be configured with reference to Table 16 above. According to an embodiment, the slice-specific information listed in Table 16 may be included in the control message. According to another embodiment, at least one of the slice-specific information listed in Table 16 may be omitted from the control message.

Exemplarily, the message 1100 of FIG. 11A may be configured as shown in the table below.

TABLE 18

| IE/Group Name | Presence | Range | IE type and reference | Semantics description |
|---|---|---|---|---|
| List of NR Cells to control List | | 1 | | |
| > Cells to Control Item | | 1 . . . <maxCellinNBDU (=512)> | | |
| >>Cell Global ID | M | | | NR CGI |
| >> PlmnToControl List | | 1 | | PLMN to control list within the cell |
| >> PlmnToControl ListItem | | 1 . . . <maxnoofBPLMNs(=12)> | | |
| >>> PLMN Identity | M | | Refer to PLMNID definition in NGAP/XnAP | PLMN Identity (MCC/MNC) in BPLMN of the cell |
| >>> SlicesPer CellList | | 1 | | List of slices serviced by the cell |
| >>>> SlicesPerCell ListItem | | 1 . . . <maxnoofSliceList (=16 or larger, TBD)> | | |
| >>>>>SliceID | M | | S-NSSAI defined in NGAP or XnAP | S-NSSAI |
| >>>>>MaxSlice ResourcePortion DL | O | | INTEGER (0 . . . 100,) | Maximum dedicated resource reservation per slices for DL (%), i.e., PRB portion |
| >>>>>MinSlice ResourcePortion DL | O | | INTEGER (0 . . . 100,) | Minimum dedicated resource reservation per slices for DL (%), i.e, PRB portion |
| >>>>>Slice PriorityControl DL | O | | INTEGER (0 . . . 100,) | Priority (scheduling weight) of the slice for DL i.e., PF weight can be multiplied by this value. 0 is reserved |
| >>>>>Max SliceResource PortionUL | O | | INTEGER (0 . . . 100,) | Maximum dedicated resource reservation per slices for UL (%) |
| >>>>>>Min SliceResource PortionUL | O | | INTEGER (0 . . . 100,) | Minimum dedicated resource reservation per slices for DL (%) |
| >>>>>Slice PriorityControl UL | O | | INTEGER (0 . . . 100,) | Priority (scheduling weight) of the slice forUL i.e., PF weight can be multiplied by this value. 0 is reserved |

Exemplarily, the message 1150 of FIG. 11B may be configured as shown in the table below.

TABLE 19

| IE/Group Name | Presence | Range | IE type and reference | Semantics description |
|---|---|---|---|---|
| List of NR Cells to control List | | 1 | | |
| > Cells to Control Item | | 1 . . . <max CellinNBDU (=512)> | | |
| >>Cell Global ID | M | | | NR CGI |
| >> SlicesPer CellList | | 1 | | List of slices serviced by the cell |
| >>> SlicesPerCell ListItem | | 1 . . . <maxnoofSliceList (=16 or larger, TBD)> | | |
| >>>>SliceID | M | | S-NSSAI defined in NGAP or Xn AP | S-NSSAI |
| >>>>MaxSlice ResourcePortion DL | O | | INTEGER (0 . . .100,) | Maximum dedicated resource reservation per slices for DL (%), i.e., PRB portion |
| >>>>MinSlice ResourcePortion DL | O | | INTEGER (0 . . .100,) | Minimum dedicated resource reservation per slices for DL (%), i.e, PRB portion |
| >>>>SlicePriority ControlDL | O | | INTEGER (0 . . .100,) | Priority (scheduling weight) of the slice for DL i.e., PF weight can be multiplied by this value. 0 is reserved |
| >>>>MaxSlice ResourcePortion UL | O | | INTEGER (0 . . .100,) | Maximum dedicated resource reservation per slices for UL (%) |
| >>>>MinSlice ResourcePortion UL | O | | INTEGER (0 . . .100,) | Minimum dedicated resource reservation per slices for DL (%) |
| >>>>SlicePriority ControlUL | O | | INTEGER (0 . . .100,) | Priority (scheduling weight) of the slice for UL i.e., PF weight can be multiplied by this value. 0 is reserved |

Embodiments described in the disclosure may use information called single network slice selection assistance information (S-NSSAI) to identify an end-to-end network slice in 5GS. The S-NSSAI may be configured as follows.

Slice/service type (SST) (e.g., 8-bit)

Slice differentiator (SD) (e.g., 24-bit), which is optional information that complements the slice/service type to distinguish multiple network slices.

In the disclosure, embodiments of the RIC indication message and the RIC control message have been described for more sophisticated KPI monitoring and radio resource management. According to various embodiments of the disclosure, a method by a first node may include classifying, by an E2 node, a call processing message received from a call processing block according to each E2 node, classifying and aggregating related statistics in global cell units, beam units, UE units, and in units of data radio bearer (DRB) per UE in the classified message, and carrying the classified message in the E2 indication message and transferring the same to the RIC. In addition, the E2 indication message may be identified based on the detailed information element (IE) of the E2 indication transmitted from the RIC, and the IE information may include MESSAGE TYPE identifier information configured based on the call processing function of the E2 node, RIC REQUEST ID identifier information, E2 NODE FUNCTION ID identifier information, and RIC SUBSCRIPTION TYPE identifier information.

According to various embodiments of the disclosure, a method by an E2 node may include transmitting an indication message to a radio access network (RIC) intelligent controller (RIC), wherein the indication message includes a measurement container, the measurement container includes measurement information including a PRB usage, a throughput, a latency, and the like based on measurement information for per beam, per UE, and per bearer of an individual cell. In addition, the method may include, after identifying the state of the E2 node through this process, transmitting a control message including information for controlling a scheduling priority and a radio resource portion for resource control per individual slice in the E2 node.

In place of a status report message, which is an E2 message, corresponds to cell-specific information, the RIC indication message of the disclosure may include a status report in units of UE belonging to each cell or in units of individual data bearer of the UE. The RIC indication message supports more accurate measurement and reporting of the UE level quality of experience. Accordingly, the performance of KPI monitoring can be improved. In addition, the RIC control message of the disclosure enables a scheduler in a base station to control resources per slice so as to further improve the efficiency of resource management.

According to embodiments of the disclosure, a method performed by an E2 node may include transmitting an indication message to a radio access network (RAN) intelligent controller (RIC), wherein the indication message is a measurement container, the measurement container includes measurement information for each bearer of each user equipment (UE) of a cell, and the measurement information includes information on at least one of a PRB usage, a throughput, and a latency.

According to embodiments of the disclosure, a method performed by an E2 node may include receiving a control request message (indication message) from a radio access network (RAN) intelligent controller (RIC), wherein the control request message includes an RIC control message, the RIC control message includes information for resource control per slice, and the information includes information on a radio resource portion and scheduling priority.

According to embodiments of the disclosure, a method performed by a radio access network (RAN) intelligent controller (RIC) may include receiving an indication message from an E2 node, wherein the indication message includes a measurement container, and the measurement container includes measurement information for each bearer of each user equipment (UE) of a cell, and the measurement information includes information on at least one of a PRB usage, a throughput, and a latency.

According to the embodiments of the disclosure, a method performed by a radio access network (RAN) intelligent controller (RIC) may include transmitting a control request message (indication message) to an E2 node, wherein the control request message includes an RIC control message, the RIC control message includes information for resource control per slice, and the information includes information on a radio resource portion and scheduling priority.

According to embodiments of the disclosure, an apparatus of an E2 node may include at least one transceiver and at least one processor, wherein the at least one processor is configured to transmit an indication message to a radio access network (RAN) intelligent controller (RIC), the indication message includes a measurement container, the measurement container includes measurement information for each bearer of each user equipment (UE) of a cell, and the measurement information includes information on at least one of a PRB usage, a throughput, and a latency.

According to embodiments of the disclosure, an apparatus of an E2 node may include at least one transceiver and at least one processor, wherein the at least one processor is configured to receive a control request message (indication message) from the radio access network (RAN) intelligent controller (RIC), the control request message includes an RIC control message, the RIC control message includes information for resource control per slice, and the information includes information on a radio resource portion and scheduling priority.

According to embodiments of the disclosure, an apparatus of a radio access network (RAN) intelligent controller (RIC) may include at least one transceiver and at least one processor, wherein the at least one processor is configured to receive an indication message from an E2 node, the indication message includes a measurement container, the measurement container includes measurement information for each bearer of each user equipment (UE) of a cell, and the measurement information includes information on at least one of a PRB usage, a throughput, and a latency.

According to the embodiments of the disclosure, an apparatus of a radio access network (RAN) intelligent controller (RIC) may include at least one transceiver and at least one processor, wherein the at least one processor is configured to transmit a control request message (indication message) to an E2 node, the control request message includes an RIC control message, the RIC control message includes information for resource control per slice, and the information includes information on a radio resource portion and scheduling priority.

According to embodiments of the disclosure, a method performed by an E2 node may include transmitting a radio access network (RAN) intelligent controller (RIC) indication message to an RIC, wherein the RIC indication message includes an E2 service model (E2SM)-KPM indication message format 1 and an E2SM-KPM indication message format 2 for key performance measurement (KPM), the E2SM-KPM indication message format 1 does not include terminal identification information, and the E2SM-KPM indication message format 2 includes terminal identification information.

According to an embodiment, the terminal identification information may be configured to indicate at least one terminal in a form for identification in a radio access network (RAN) of the E2 node, and the E2SM-KPM indication message format 2 includes measurement information for the at least one terminal.

According to an embodiment, wherein the E2 node is one of a next generation node B (gNB), a distributed unit (DU), an evolved node B (eNB), a gNB-central unit (CU), an en-gNB, and an ng-eNB.

According to various embodiments, a method performed by a radio access network (RAN) intelligent controller (RIC) may include transmitting an RIC indication message to an E2 node, wherein the RIC indication message includes an E2 service model (E2SM)-KPM indication message format 1 and an E2SM-KPM indication message format 2 for key performance measurement (KPM), the E2SM-KPM indication message format 1 does not include terminal identification information, and the E2SM-KPM indication message format 2 includes terminal identification information.

According to an embodiment, the terminal identification information may be configured to indicate at least one terminal in a form for identification in the radio access network (RAN) of the E2 node, and the E2SM-KPM indication message format 2 includes measurement information for the at least one terminal.

According to an embodiment, the E2 node is one of a next generation node B (gNB), a distributed unit (DU), an evolved node B (eNB), a gNB-central unit (CU), an en-gNB, and an ng-eNB.

According to various embodiments, a method performed by an E2 node may include receiving a radio access network (RAN) intelligent controller (RIC) control message from an RIC, wherein the RIC control message includes slice identification information and control information on a network slice corresponding to the slice identification information.

According to an embodiment, the slice identification information may include single-network slice selection assistance information (S-NSSAI), and the E2 node is one of a next generation node B (gNB), a distributed unit (DU), an evolved node B (eNB), a gNB-central unit (CU), an en-gNB, and an ng-eNB.

According to an embodiment, the RIC control message may include control information defined per cell and per slice in the E2 node.

According to various embodiments, a method performed by an E2 node may include receiving a radio access network (RAN) intelligent controller (RIC) control message from an RIC, wherein the RIC control message includes slice identification information and control information on a network slice corresponding to the slice identification information.

According to an embodiment, the slice identification information may include single-network slice selection assistance information (S-NSSAI), and the E2 node is one of a next generation node B (gNB), a distributed unit (DU), an evolved node B (eNB), a gNB-central unit (CU), an en-gNB, and an ng-eNB.

According to an embodiment, the RIC control message may include control information defined per cell and per slice in the E2 node.

According to various embodiments, an apparatus of an E2 node may include at least one transceiver and at least one processor, wherein the at least one processor is configured to perform the method by the E2 node.

According to various embodiments, an apparatus of a radio access network (RAN) intelligent controller (RIC) may include at least one transceiver and at least one processor, wherein the at least one processor is configured to perform the method by the RIC.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an E2 node, the method comprising:

transmitting a radio access network (RAN) intelligent controller (RIC) indication message to an RIC, wherein the RIC indication message is configured with an E2 service model (E2SM)-key performance measurement (KPM) indication message format 2, wherein the E2SM-KPM indication message format 2 includes measurement information and terminal identification information, wherein the measurement information is for each of at least one terminal, and wherein the terminal identification information indicates at least one terminal in the RAN.

2. The method of claim 1, wherein the E2 node is one of a next generation node B (gNB), a distributed unit (DU), an evolved node B (eNB), a gNB-central unit (CU), an en-gNB, and an ng-eNB.

3. The method of claim 1, further comprising:

receiving, from the RIC, a subscription request including an event condition, wherein the transmitting of the RIC indication message to the RIC is based on the event condition.

4. The method of claim 3, further comprising:
configuring the event condition; and
transmitting, to the RIC, a subscription response in response to the subscription request.

5. A method performed by a radio access network (RAN) intelligent controller (RIC), the method comprising:
receiving an RIC indication message from an E2 node,
wherein the RIC indication message is configured with an E2 service model (E2SM)-key performance measurement (KPM) indication message format 2,
wherein the E2SM-KPM indication message format 2 includes measurement information and terminal identification information,
wherein the measurement information is for each of at least one terminal, and
wherein the terminal identification information indicates at least one terminal in the RAN.

6. The method of claim 5, wherein the E2 node is one of a next generation node B (gNB), a distributed unit (DU), an evolved node B (eNB), a gNB-central unit (CU), an en-gNB, and an ng-eNB.

7. An E2 node, the E2 node comprising:
a transceiver; and
at least one processor coupled with the transceiver and configured to:
transmit a radio access network (RAN) intelligent controller (RIC) indication message to an RIC,
wherein the RIC indication message is configured with an E2 service model (E2SM)-key performance measurement (KPM) indication message format 2,
wherein the E2SM-KPM indication message format 2 includes measurement information and terminal identification information,
wherein the measurement information is for each of at least one terminal, and
wherein the terminal identification information indicates at least one terminal in the RAN.

8. A radio access network (RAN) intelligent controller (RIC), the RIC comprising:
a transceiver; and
at least one processor coupled with the transceiver and configured to:
receive an RIC indication message from an E2 node,
wherein the RIC indication message is configured with an E2 service model (E2SM)-key performance measurement (KPM) indication message format 2,
wherein the E2SM-KPM indication message format 2 includes measurement information and terminal identification information,
wherein the measurement information is for each of at least one terminal, and
wherein the terminal identification information indicates at least one terminal in the RAN.

9. The E2 node of claim 7, wherein the E2 node is one of a next generation node B (gNB), a distributed unit (DU), an evolved node B (eNB), a gNB-central unit (CU), an en-gNB, and an ng-eNB.

10. The RIC of claim 8, wherein the E2 node is one of a next generation node B (gNB), a distributed unit (DU), an evolved node B (eNB), a gNB-central unit (CU), an en-gNB, and an ng-eNB.

* * * * *